United States Patent [19]

Ohashi et al.

[11] Patent Number: 5,130,872
[45] Date of Patent: Jul. 14, 1992

[54] CASSETTE TAPE PLAYER HAVING AN ACTUATING MECHANISM FOR CHANGING TRAVELING DIRECTION OF A TAPE AND A QUICK TAPE TRANSVERSE LEVER

[75] Inventors: Tamaki Ohashi, Tokyo; Hideki Oshima, Sayama, both of Japan

[73] Assignee: Tuner Co., Ltd., Tokyo, Japan

[21] Appl. No.: 530,532

[22] Filed: May 30, 1990

[30] Foreign Application Priority Data

May 30, 1989 [JP] Japan ................. 1-134713

[51] Int. Cl.$^5$ .................. G11B 5/54; G11B 21/22
[52] U.S. Cl. ........................ 360/105; 360/137
[58] Field of Search .................. 360/137, 105

[56] References Cited

U.S. PATENT DOCUMENTS 4,031,475 7/1991 Takai ................... 360/137 X
4,722,013 1/1988 Hayashi ................... 360/105

Primary Examiner—A. J. Heinz
Attorney, Agent, or Firm—Armstrong, Nikaido, Marmelstein, Kubovcik & Murray

[57] ABSTRACT

A cassette tape player having a quick traverse lever and a rewinding lever, each mounted on a chassis of the player so as to be movable forward or rearward in a reciprocating manner in a longitudinal direction of the chassis. The quick traverse lever moves forward so as to move a head plate rightward in order to perform a quick traverse operation of a tape of the player, the head plate being mounted on the chassis so as to be slidable rightward or leftward along the chassis. The cassette tape player further includes an actuating mechanism for effecting a change in the travel direction of the tape, the actuating mechanism being swingably mounted on the chassis, while being movable forward or rearward in the longitudinal direction of the chassis. The cassette player further includes a spring mounted on the chassis for urging the actuating mechanism rearward and for biasing the actuating mechanism counterclockwise in its normal condition.

4 Claims, 25 Drawing Sheets

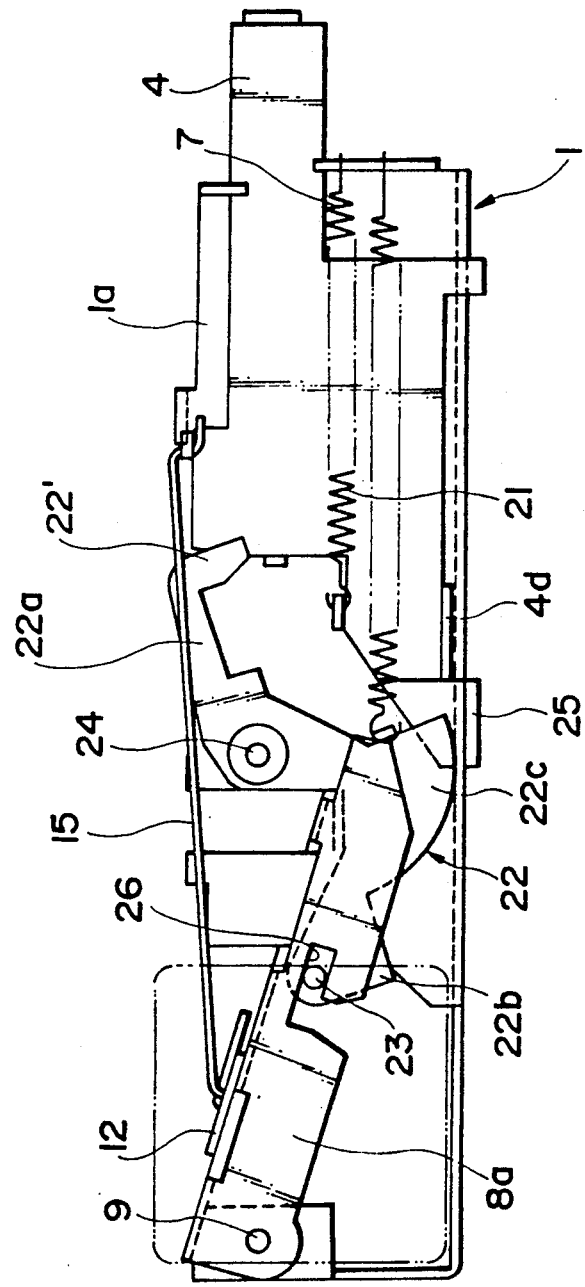

FIG. 15
FIG. 16
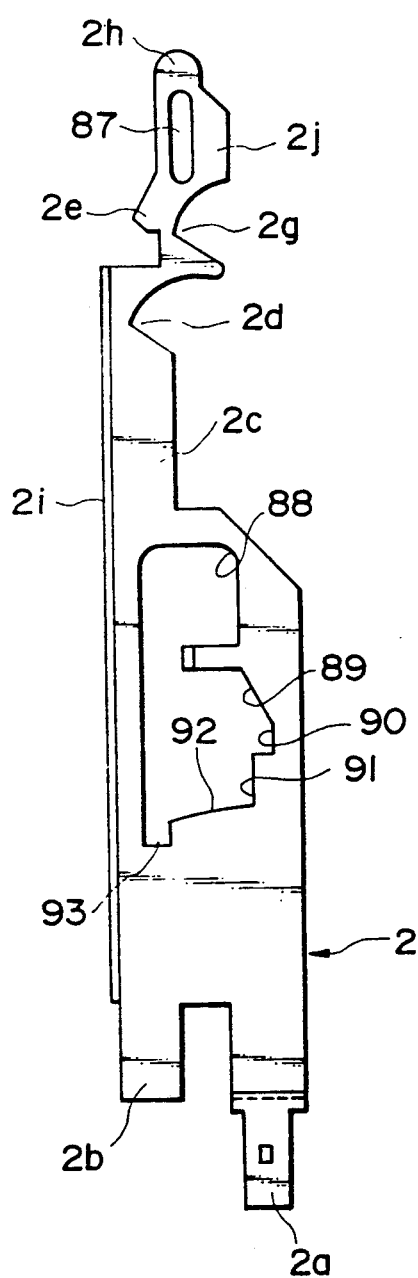
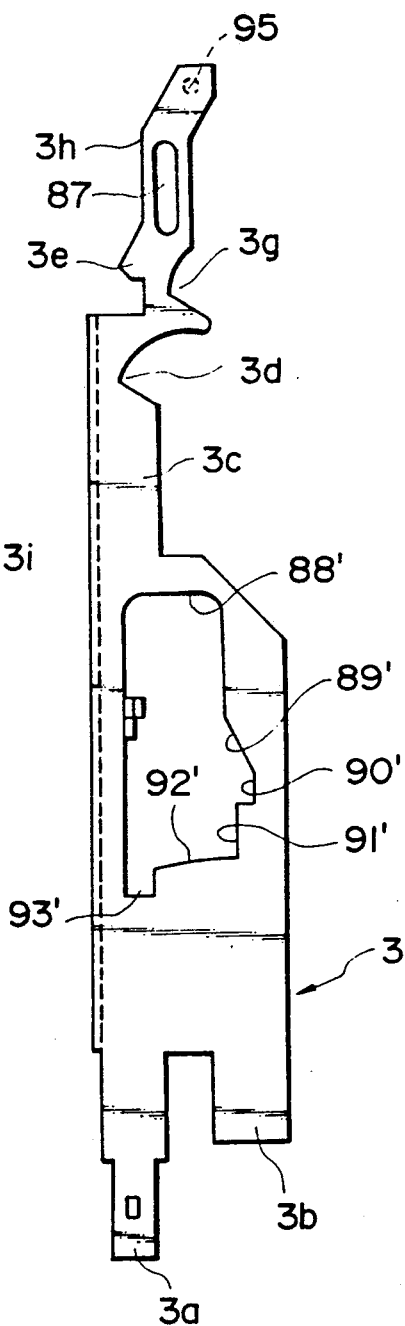

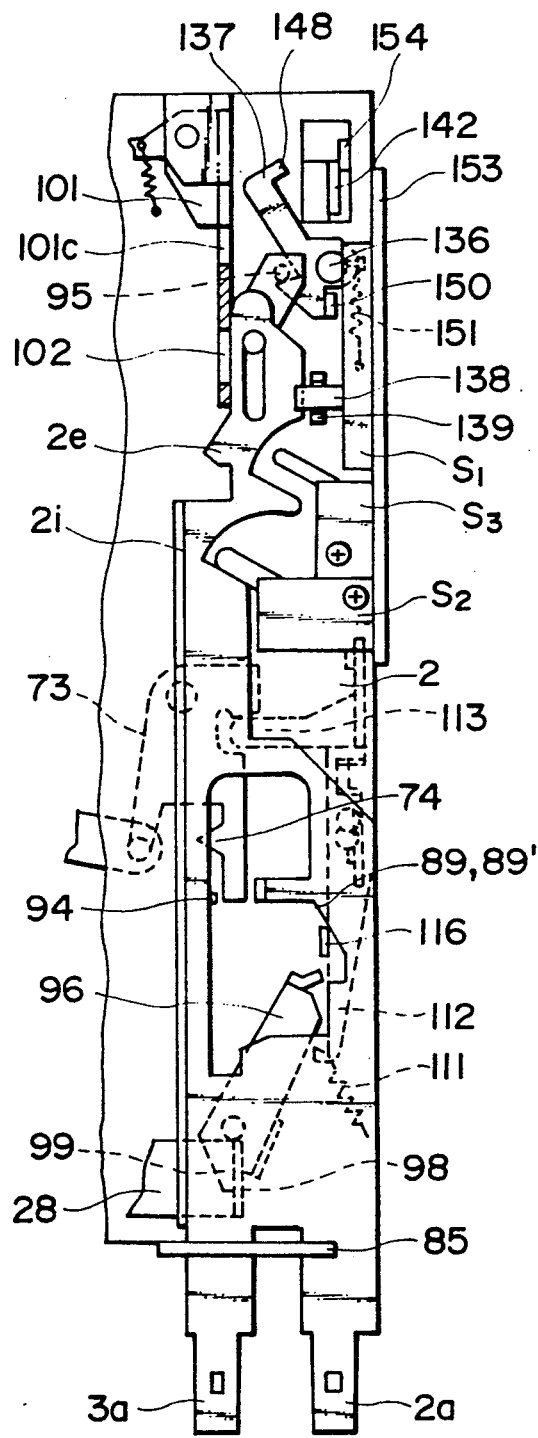
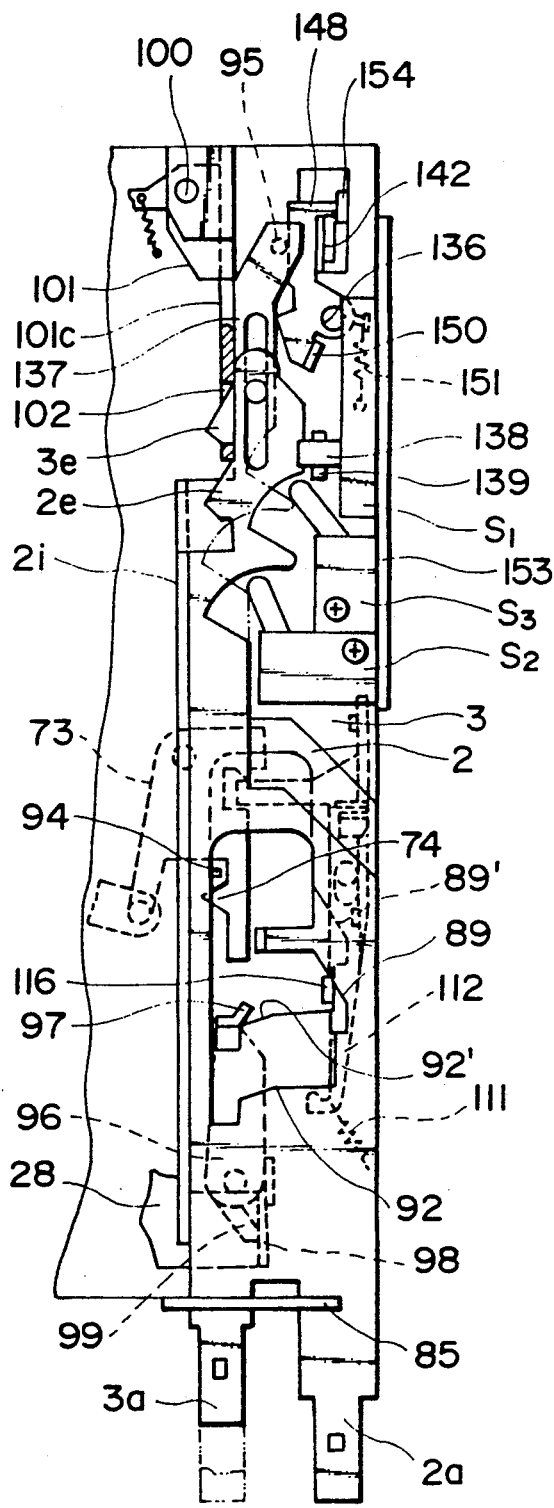

FIG. 29
FIG. 30
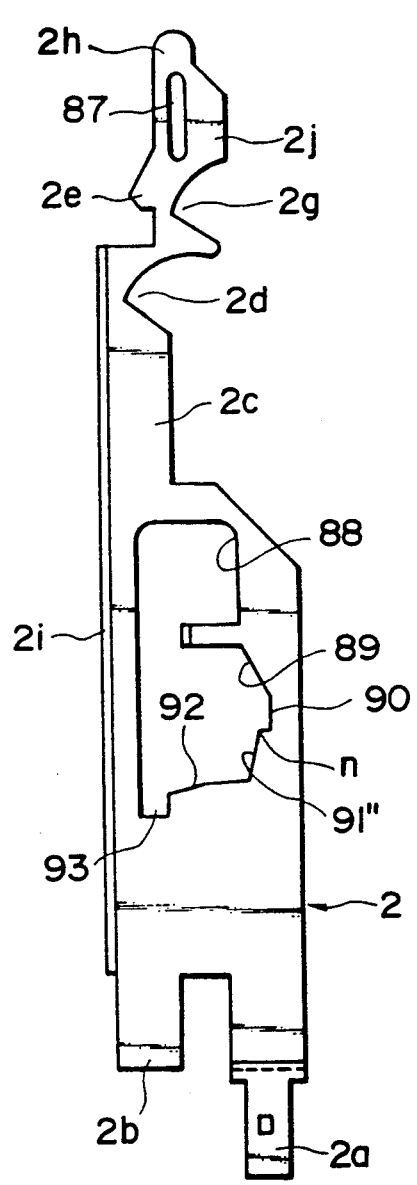
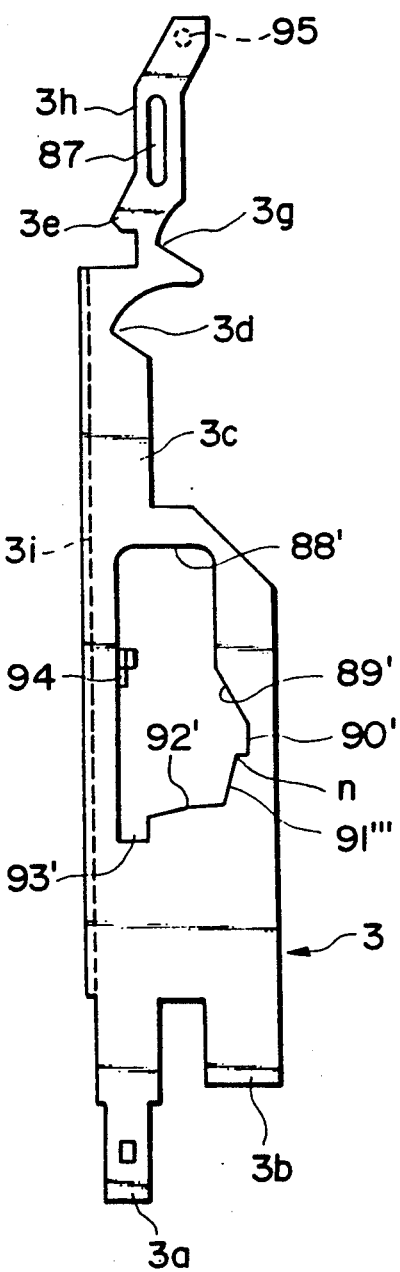

CASSETTE TAPE PLAYER HAVING AN ACTUATING MECHANISM FOR CHANGING TRAVELING DIRECTION OF A TAPE AND A QUICK TAPE TRANSVERSE LEVER

FIELD OF THE INVENTION

The present invention relates to a cassette tape player.

DESCRIPTION OF THE PRIOR ART

Hitherto, it is known that, for example as disclosed in Japanese Patent Laid-Open No. 62-89258, a cassette tape player of this kind is provided with: a quick traverse lever; a quick traverse mechanism which moves a head plate rightward to bring the same into a sound non-production position when the quick traverse lever is moved forward, which quick traverse mechanism also releases a pinch roller from a capstan shaft; a rewinding lever; and a channel selector mechanism which operates the quick traverse mechanism when the quick traverse lever is moved forward, which channel selector mechanism realizes a change in traveling direction of a tape of the player.

A conventional cassette tape player described above suffers from a problem in that: since the conventional tape player has a construction in which a quick traverse operation is conducted simultaneously with operation of the channel selector mechanism when the rewinding lever is operated, and since there is a mechanical time lag in these operations, the channel selector mechanism is often operated after the head plate is moved rightward. Namely, in case that the channel selector mechanism is operated after the head plate is moved rightward, it is not possible for the tape player to conduct a sound reproduction of the tape until operation of the channel selector mechanism is completed after the head plate is moved rightward, so that a certain amount of recorded portion of the tape can not be reproduced even after the rewinding level is permitted to move rearward so as to bring the tape player into its sound reproduction condition. This is the problem inherent in the conventional tape player. In addition, in case that only operation of the channel selector mechanism is conducted without conducting the quick traverse operation of the tape player, it is necessary for the conventional tape player to comprise an additional level for exclusively operating the channel selector mechanism. However, such additional level makes the tape player more complex in construction.

Under such circumstances, in order to resolve the above problems inherent in the conventional tape player, another conventional cassette tape player is disclosed in Japanese Patent Laid-Open No. 64-86352, the another conventional player comprising: a quick traverse layer, a quick traverse mechanism which moves a head plate rightward to bring the same into a sound non-production position when the quick traverse lever is moved forward, which quick traverse mechanism also releases a pinch roller from a capstan shaft; a rewinding lever; and a channel selector mechanism which operates the quick traverse mechanism when the quick traverse lever is moved forward, which channel selector mechanism realizes a change in traveling direction of a tape of the player, characterized in that:

a first means for operating the channel selector mechanism is provided between the rewinding lever and the channel selector mechanism, which first means cooperates with the rewinding level in operating the channel selector mechanism when the rewinding lever is moved forward by an amount of a front half of a stroke of forward movement of the rewinding lever; and a second means for operating the quick traverse mechanism is provided between the rewinding lever and the quick traverse mechanism, which second means cooperates with the rewinding lever in operating the quick traverse mechanism when the rewinding lever is moved forward by an amount of a rear half of the stroke of forward movement of the rewinding lever.

In the another conventional tape player having the above construction, it is possible for the rewinding lever to operate the channel selector mechanism and the quick traverse mechanism individually by controlling the stroke of forward movement of the rewinding lever, and, therefore it is not necessary for the another conventional tape player to comprise a lever for exclusively conducting a rewinding operation of the player and a lever for exclusively operating the channel selector mechanism, which makes the another conventional tape player simple in construction.

PROBLEM TO BE RESOLVED BY THE INVENTION

However, the another conventional tape player described above suffers from the following problems, because the player is provided with a stopping member for restricting the stroke of forward movement of the rewinding lever in order to eliminate a fear that a channel selector mechanism is operated by mistake when the quick traverse lever is released from its forward position through forward movement of the rewinding lever.

Namely, in case that it is required to rewind the tape in the tape player, when the rewinding lever is moved forward after having made a mistake of moving the quick traverse lever forward to hold the same at its forward position, only the quick traverse lever is released from its forward position without operating the channel selector mechanism. Consequently, in this case, it is required to move the rewinding lever forward again in order to rewind the tape. However, such repetitive operation of the rewinding lever is very cumbersome. On the other hand, in case that the channel selector mechanism is operated, the user stops pushing the rewinding lever forward in a front half of the stroke of forward movement of the rewinding lever after he feels a load of the head plate to be moved rightward. However, such feeling of the head plate load varies in individual users. Therefore, it is not possible to completely prevent the head plate from being moved rightward when the rewinding lever is moved forward. As a result, quick traverse operation of the tape is often conducted in the tape player to produce a quick traverse noise of the tape, and the user suffers from such noise.

The present invention was made to resolve the above problems inherent in the conventional cassette tape player by providing:

A cassette tape player comprising: a quick traverse lever so mounted on a chassis of the player as to be movable forward and rearward in a reciprocating manner in a longitudinal direction of a chassis of the player, which lever moves forward to move a head plate rightward so as to perform a quick traverse operation of a tape of the player, the head plate being so mounted on the chassis as to be slidable rightward and leftward; and a rewinding lever so mounted on the chassis as to be movable forward and rearward in a reciprocating manner in the longitudinal direction of the chassis, which lever moves forward to move the head plate rightward so as to realize a change in traveling direction of the tape so that a rewinding operation of the tape is conducted; wherein, the improvement comprises:

the player further including: an actuating mechanism for realizing a change in traveling direction of the tape, the actuating mechanism being swingably mounted on the chassis of the player while movable forward and rearward in the longitudinal direction of the chassis; and a spring for urging the actuating mechanism rearward and for biasing the same counterclockwise in its normal condition, the spring mounted on the chassis; and each of the quick traverse lever and the rewinding level including: a first portion which abuts on a working segment both in its inoperative condition and at a time when each of the levers is moved forward, to prevent the working segment from rotating in an urging direction in which the working segment is urged, the working segment being provided in the actuating mechanism; a second portion which permits the working segment to rotate in the urging direction and engage with the second portion so as to restrict the forward movement of each of the levers in stroke, the working segment having been separated from the first portion through the forward movement of each of the levers; and a third portion which permits one of the levers to move forward further in stroke than the second portion restricts without causing the working segment to engage with the second portion, in a condition in which the other of the levers is in its inoperative condition to have the first portion abut on the working segment of the actuating mechanism.

In the cassette tape player of the present invention having the above construction, the actuating mechanism is constructed of: a slidable segment which is movable forward and rearward in the longitudinal direction of the chassis while connected with a channel selector mechanism; and an elongated swingable lever which is movable forward and rearward in the longitudinal direction of the chassis while swingable in a horizontal plane of the chassis and forced to rotate counterclockwise in its normal condition, an upper portion of the elongated swingable lever being so connected with the slidable segment as to permit the slidable segment to freely rotate relative to the elongated swingable lever and to move forward and rearward in the longitudinal direction of the chassis together with the elongated swingable lever. Preferably, each of the levers is provided with a working window defined by a peripheral edge, one side of which peripheral edge sequentially form the first portion, the second portion and the third portion of each of the levers. On the other hand, the third portion of each of the levers is constructed of an inclined portion which forcibly moves the working segment having abutted thereon in a direction counter to the urging direction of the working segment when each of the levers is moved forward in the longitudinal direction of the chassis, so that the working segment is moved further leftward than an upper end of the third portion of each of the levers.

ACTION OF THE INVENTION

In sound reproducing operation of the cassette tape player of the present invention, when the quick traverse lever of the tape player is moved forward to conduct the quick traverse operation of the cassette tape loaded in the player, the first portion of the quick tranverse lever is separated from the working segment of the actuating mechanism. At this time, however, the working segment of the actuating mechanism still abuts on the first portion of the rewinding lever, and, therefore still remains in its inoperative position. Under such circumstances, the quick transverse lever of the tape player of the present invention is further moved forward to permit its third portion to engage with the working segment of the actuating mechanism. When the third portion of the quick traverse lever engages with the working segment of the actuating mechanism, the quick traverse lever is held in its forward position by a suitable means such as an engaging means. At this time, in the tape player, the head plate is moved rightward to its idle position so that the pinch roller is released from the capstan shaft, whereby quick traverse operation of the cassette tape is conducted. When the user stops such quick traverse operation of the cassette tape, the rewinding lever remained in its inoperative position is automatically released from its forward position and moved rearward. Actions similar to the above are also conducted when the rewinding lever is moved forward to rewind the cassette tape in a condition in which a sound reproduction operation of the cassette tape is conducted. In this case, when the rewinding lever is moved forward, the head plate is moved rightward. At the same time, the pinch roller is released from the capstan shaft to permit the rewinding operation of the cassette tape to be conducted.

In addition, a change in traveling direction of the cassette tape is realized by moving the rewinding lever forward. When it is required to stop such rewinding operation of the cassette tape, the quick traverse lever remaining in its inoperative position is moved forward so that the rewinding lever is automatically released from its forward position and moves rearward to its inoperative position. In such rearward movement of the rewinding lever, a change in traveling direction of the cassette tape is realized again to permit the cassette tape to travel in its initial direction.

Consequently, in the cassette tape player of the present invention, for example, in case that the rewinding operation of the cassette tape is required, even when the rewinding lever is moved forward after the quick traverse lever is moved forward by mistake and held in its forward position, it is possible for a single stroke of such forward movement of the rewinding lever to release the quick traverse lever from its forward position, to realize quick traverse opertion of the cassette tape and to realize a change in traveling direction of the cassette tape without causing any trouble and without making any mistake.

Further, in the cassette tape player of the present invention, in order to realize a change in traveling direction of the cassette tape, when both of the quick traverse lever and the rewinding lever are moved forward together, the first portion of the quick traverse lever is separated from the working segment of the actuating mechanism simultaneously with the first portion of the rewinding lever. Then, the second portion of the quick traverse lever engages with the working segment of the actuating mechanism simultaneously with the second portion of the rewinding lever, so that the actuating mechanism is moved forward against the urging force applied thereto, whereby the channel selector mechanism is actuated to realize a change in traveling direction of the cassette tape.

In the cassette tape player of the present invention having the above construction, in case that the third portion of each of the quick traverse lever and the rewinding lever is constructed of an inclined portion which forcibly moves the working segment having abutted thereon in a direction counter to an urging direction of the working segment when each of the levers is moved forward in the longitudinal direction of the chassis of the cassette tape player of the present invention so that the working segment is moved further leftward than an upper end of the third portion of each of the levers, the quick traverse lever is held in its forward position. On the other hand, in a condition in which the working segment of the actuating mechanism acts on the first portion of the rewinding lever which remains in its inoperative position, when the rewinding lever is moved forward, the working segment is separated from the first portion of the rewinding lever, and simultaneously abuts on the inclined third portion of the quick traverse lever having been held in its forward position so that the working segment is positioned at a further left position than that of the upper end of the third portion of the rewinding lever. As a result, without acting on the working segment, the second portion of the rewinding lever can pass through the working segment so that a smooth reciprocating operation of the rewinding lever is accomplished. In case that inclination of the inclined third portion of the quick traverse lever is less than that in the above case, i.e., a lower end of the inclined third portion of the quick traverse lever is positioned more leftward than that in the above case, when the quick traverse lever is held in its forward position, the working segment of the actuating mechanism is moved in a direction counter to the urging direction of the working segment by such inclined third portion so as to be positioned more leftward than a position of the upper end of the third portion of the quick traverse lever and so as to be separated from the first portion of the rewinding lever. Consequently, under such circumstances, it is possible for the second portion of the rewinding lever to smoothly pass through the working segment without acting thereon to realize a smooth reciprocating movement of the rewinding lever in the longitudinal direction of the chassis of the tape player. Action similar to the above is also realized when the quick traverse lever is moved forward in a condition in which the rewinding lever is held in its forward position.

BRIEF DESCRIPTION OF THE DRAWINGS

The accompanying drawings shows essential parts of the embodiment of the cassette tape player of the present invention.

FIG. 6 is a left side view of the player of FIG. 5;

FIG. 12 (b) is a cross-sectional view of an essential part of the player of FIG. 1, illustrating the relationship between the head plate and the chassis of the player in the operative condition of the player;

FIG. 15 is a plan view of the quick transverse lever of the player of FIG. 1;

FIG. 16 is a plan view of the rewinding lever of the player of FIG. 1;

FIG. 17 is a partial plan view of the player of FIG. 1, illustrating mainly the relationship between the quick traverse lever/the rewinding lever and the actuating mechanism of the player of FIG. 1;

FIG. 18 is a partial plan view of the player similar to FIG. 17, illustrating the rewinding operation of the cassette tape of the player of FIG. 1;

FIG. 29 is a plan view of the quick traverse lever of the player of FIG. 1, illustrating a modified example of the quick traverse lever;

FIG. 30 is a plan view of the rewinding lever of the player of FIG. 1, illustrating a modified example of the rewinding lever;

Figure 1:
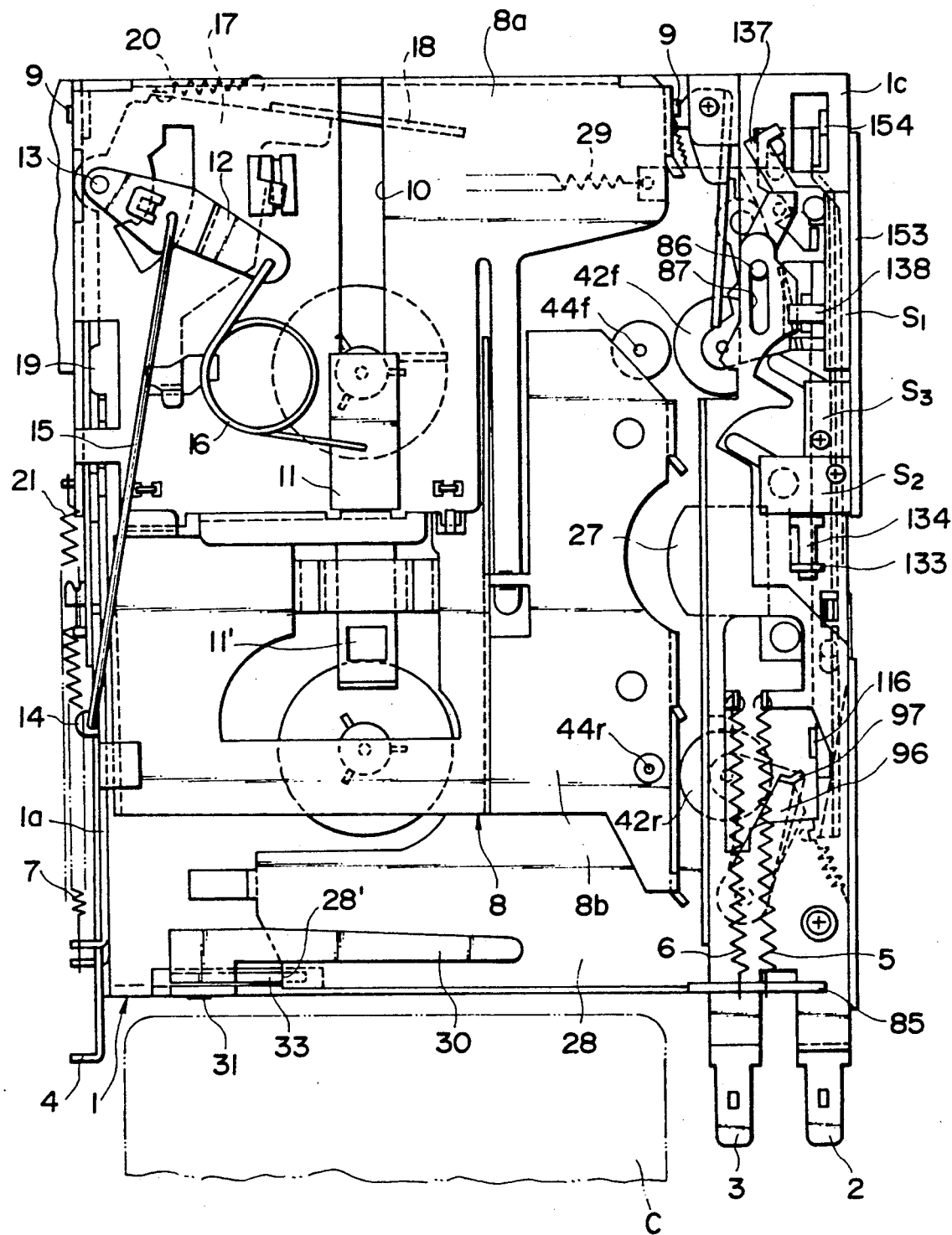
FIG. 1 is a plan view of the player of the present inventon in its inoperative condition.

In the accompanying drawings: the reference numeral 1 denotes a chassis; 1c a sub-chassis; 2 a quick traverse lever; 3 a rewinding lever; 28 a head plate; 47 a channel selector member; 48f a front rotary plate; 48r a rear rotary plate; 60 a channel selector mechanism; 88 a working window of the quick traverse lever 2; 88' a working window of the rewinding lever 3; 89 a first portion of the quick traverse lever 2; 89' a first portion of the rewinding lever 3; 90 is a second portion of the quick traverse lever 2; 90' a second portion of the rewinding lever 3; 91 is a third portion of the quick traverse lever 2; 91' a a third portion of the rewinding lever 3; 92 a sloping edge portion of the quick traverse lever 2; 92' a sloping edge portion of the rewinding lever 3; 96 a swingable lever; 97 a projected portion of the swingable lever 96; 101 an engaging member; 107 an actuating mechanism; 108 a slidable member; 111 a spring; 112 a swingable lever; and 116 a working segment portion of the swingable lever 112.

EMBODIMENTS

Figure 2:
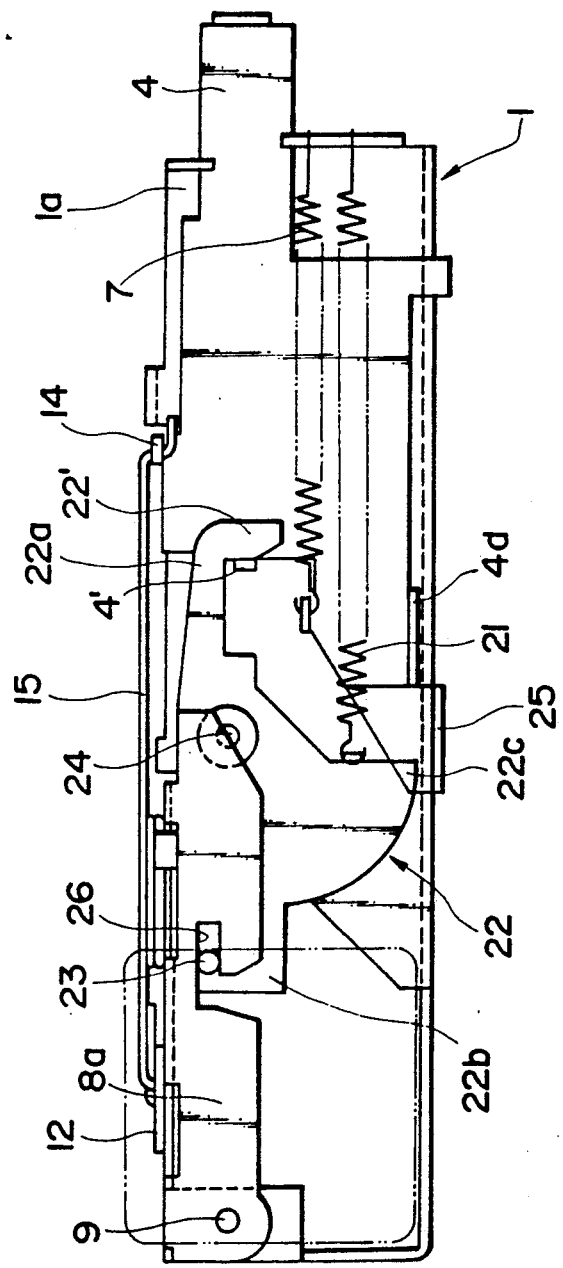
FIG. 2 is a left side view of the player of FIG. 1.
Figure 3:
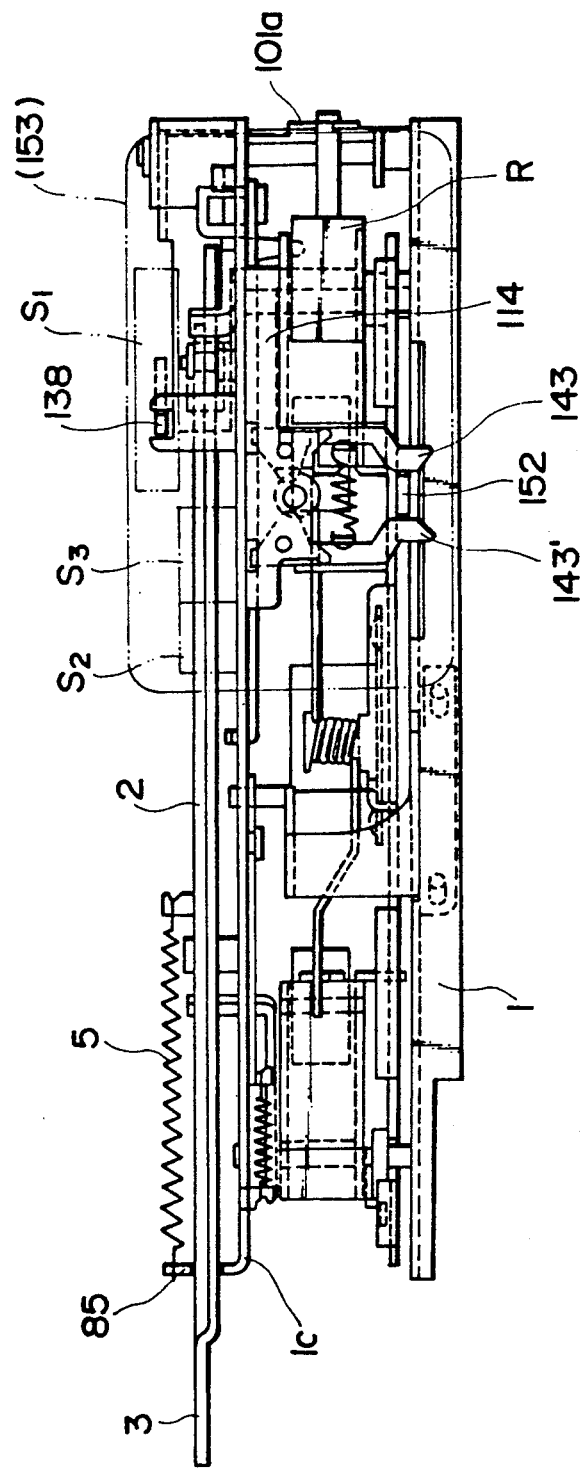
FIG. 3 is a right side view of the player of FIG. 1.
Figure 5:
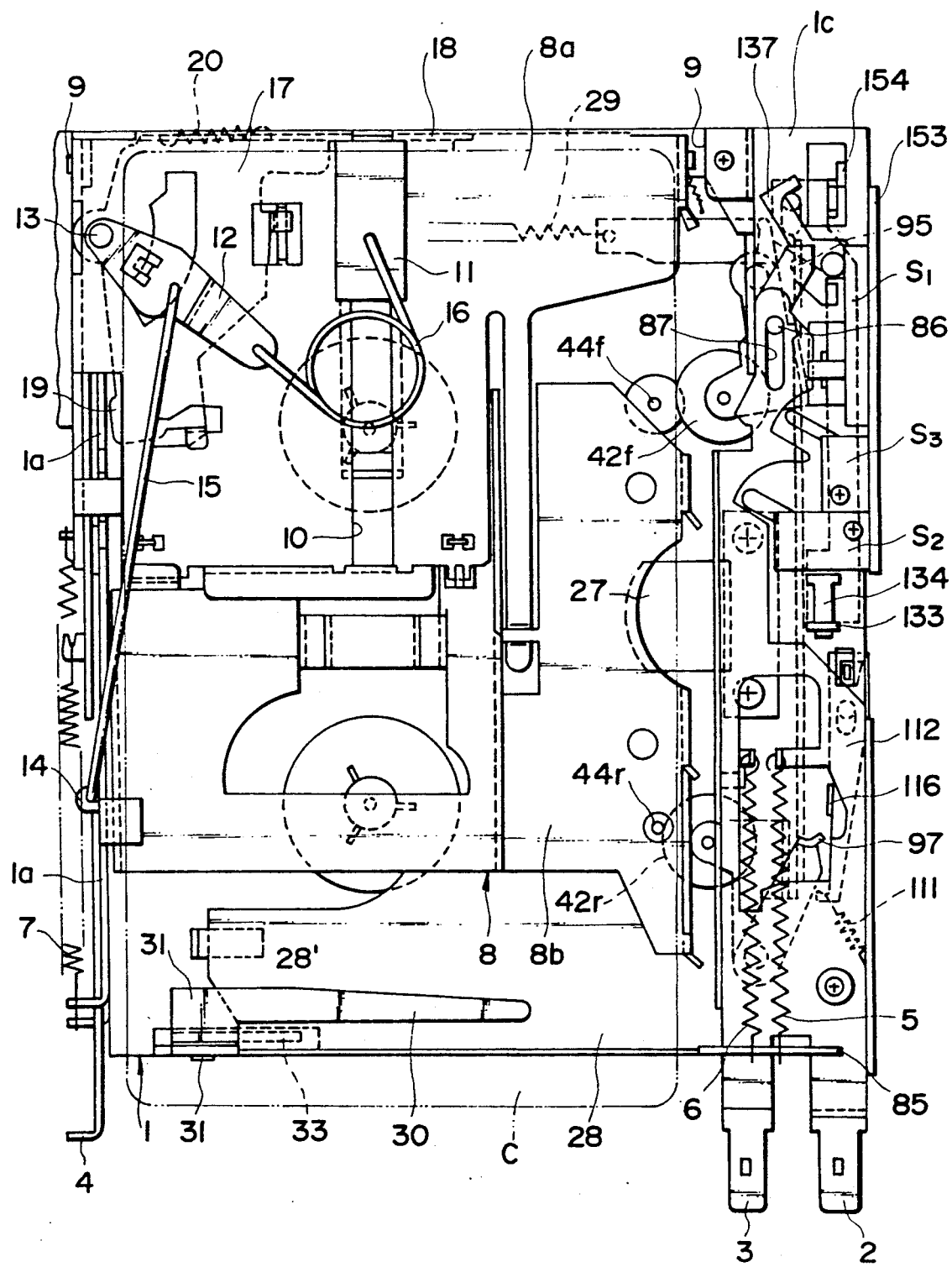
FIG. 5 is a plan view of the player of FIG. 1 in operative condition.

Embodiments of the present invention will be hereinbelow described in detail with reference to the drawings in which: FIG. 1 show a plan view of the cassette tape player of the present invention in its inoperative condition; FIGS. 2 and 3 are side views of the player in its inoperative condition; FIG. 5 shows a plan view of the player in its operative condition; and FIG. 6 shows a side view of the player in its operative condition.

Figure 4:
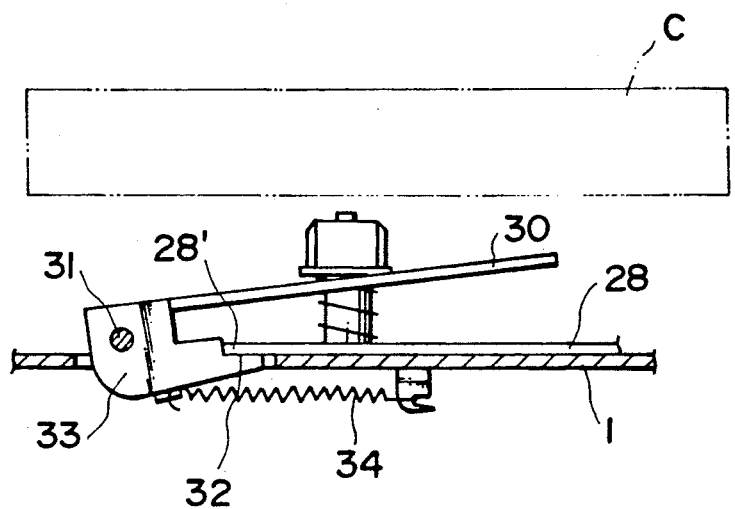
FIG. 4 is a partial front view of the player of FIG. 1.
Figure 10:
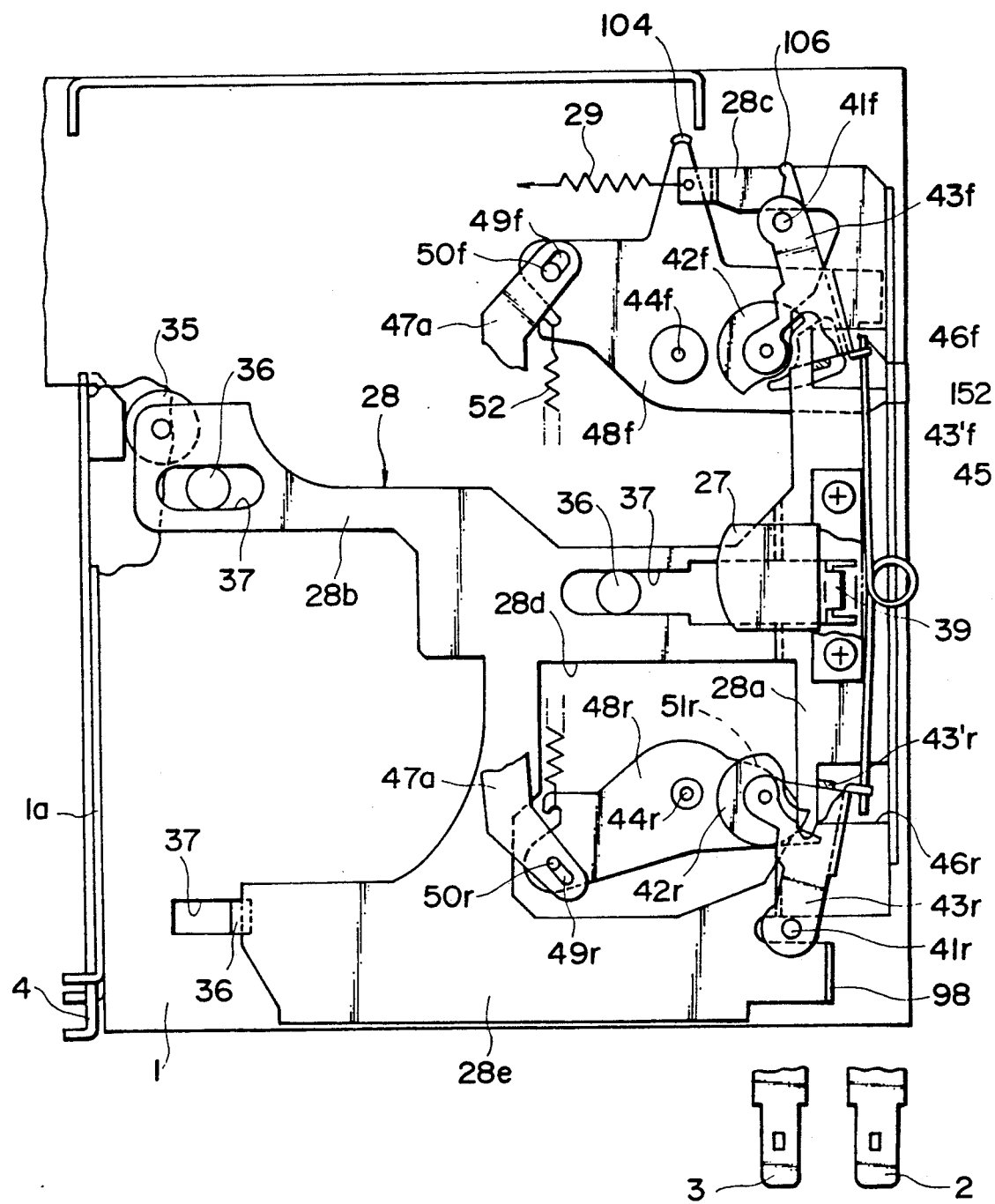
FIG. 10 is a plan view of the player of FIG. 5 in the inoperative condition, illustrating the head plate and a part of the channel selector mechanism of the player.
Figure 11:
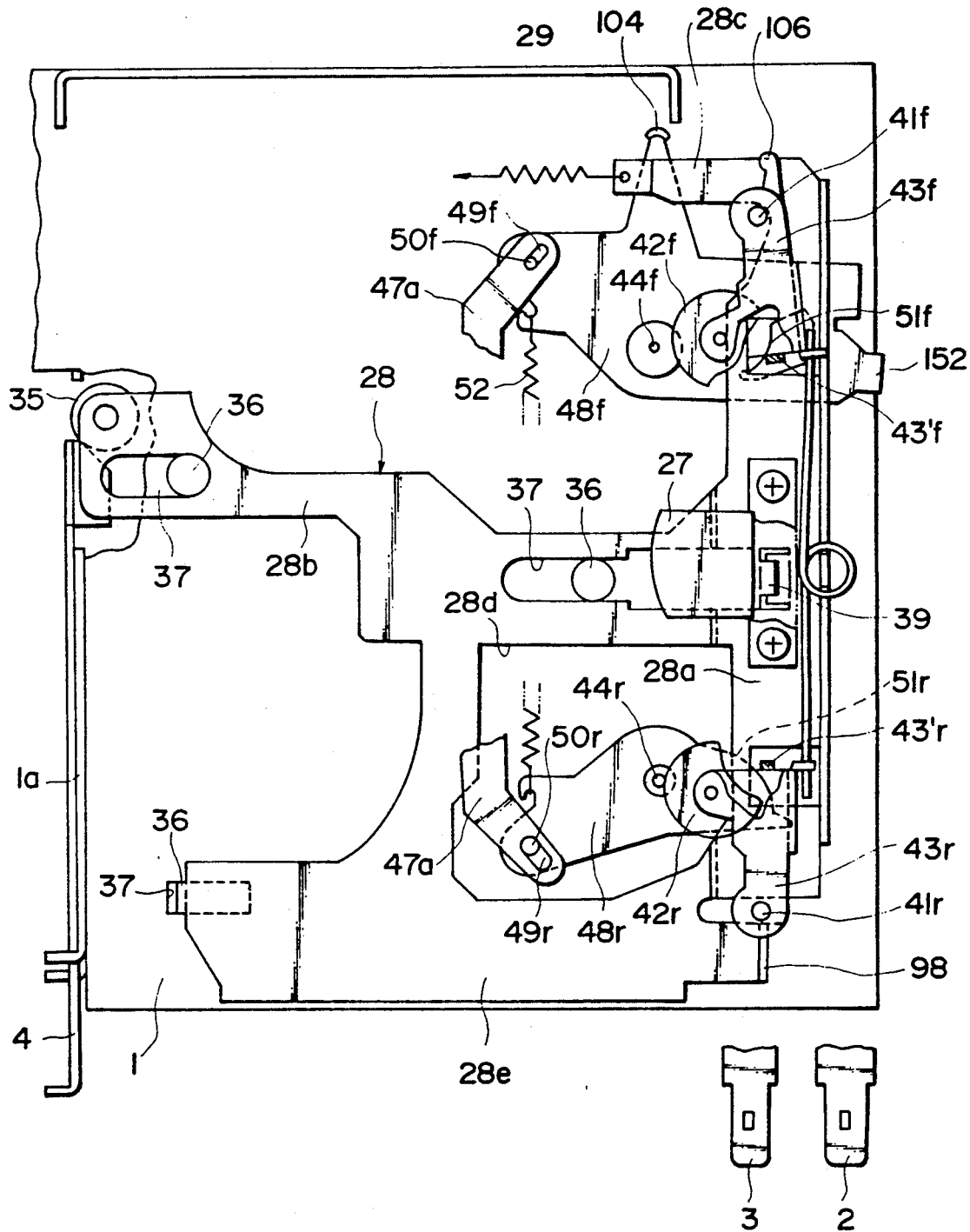
FIG. 11 is a plan view of the player similar to that of FIG. 10, illustrating the operative condition of the player.

The reference numeral 1 denotes a chassis of the cassette tape player of the present invention. As shown in FIG. 1, the chassis 1 is provided with a sub-chassis 1c in a right side portion of the chassis 1, the sub-chassis 1c being positioned in a higher-level plane than a level-plane in which the chassis 1 lies. Mounted on an upper surface of the chassis 1 are: a quick traverse lever 2 and a rewinding lever 3 both of which are movable forward and rearward in a longitudinal direction of the chassis 1 in a reciprocating manner, the traverse lever 2 being arranged in parallel to the rewinding lever 3; and an ejection lever 4 which is movable forward and rearward in the longitudinal direction of the chassis 1 in a reciprocating manner, the ejection lever 4 being mounted on a left side portion of the chassis 1. These levers 2, 3 and 4 are resiliently urged forward in the longitudinal direction of the chassis 1 toward their inoperative position by means of return springs 5, 6 and 7, respectively. On the other hand, as shown in FIG. 1, the reference numeral 8 denotes a cassette holder consisting of: a front frame 8a mounted on a pair of pivots 9 fixed to opposite left and right ends of a rear portion of the chassis 1 so as to be swingable in a vertical plane perpendicular to the plane in which the chassis 1 lies; and a rear frame 8b so connected to a rear end portion of the front frame 8a as to be movable upward and downward in a direction perpendicular to the plane in which the chassis 1 lies, in a condition in which the rear frame 8b is kept in its horizontal state during such upward and downward movement thereof. In a central portion of the front frame 8a is provided a guide groove 10 extending in the longitudinal direction of the chassis 1. In the guide groove 10 is slidably mounted an elongated guide piece 11 which is provided with an engaging pawl 11' in its rear end portion. The engaging pawl 11' engages with one of reel wheels of the cassette tape C when the cassette tape C is loaded into the cassette holder 8. As shown in FIG. 1, the reference numeral 12 denotes a spring support an end portion of which is rotatably mounted on an upper surface of the front frame 8a of the cassette holder 8 through a pivot 13. A central portion of the spring support 12 is connected with an end portion of a connecting rod 15 the other end portion of which is connected with a supporting bracket 14 provided in the ejection lever 4. The other end portion or free end portion of the spring support 12 is connected with the guide piece 11 through a reversible spring 16 which urges the guide piece 11 in a normal condition toward an ejection position of the cassette tape C. The reference number 17 denotes a plate-like holding member which is so mounted on the pivot 13 as to be rotatable in a horizontal plane parallel to the plane in which the chassis 1 lies, the holding member 17 being disposed in a position under an lower surface of a front portion of the front frame 8a as shown in FIG. 1. A working projection 18 is formed in an end portion of the holding member 17 so as to extend rightward across the guide groove 10 of the front frame 8a of the cassette holder 8. In addition, the holding member 17 is provided with a tongue 19 in its left portion, while always resiliently urged leftward toward a side wall 1a of the chassis 1 by means of a spring 20. As a result, the tongue 19 of the holding member 17 abuts on an upper edge portion of the side wall 1a of the chassis 1 so that the cassette holder 8 is kept in a horizontal state through the holding member 17. The reference numeral 22 denotes a working plate which is mounted on the side wall 1a of the chassis 1 through a pivot 24 so as to be swingable in a plane perpendicular to the plane in which the chassis 1 lies. A hook-like engaging portion 22' is formed in a rear portion 22a of the working plate 22, which engaging portion 22' extends rearward from the pivot 24 to engage with a stopping portion 4' of the ejection lever 4, so that the ejection lever 4 is held in a ejection position against the resilient force exerted by the spring 7. The stopping portion 4' of the ejection lever 4 is formed by bending a front portion of the ejection lever 4. In a front portion 22b of the working plate 22 is provided an engaging pin 23 which engages with a notched groove 26 formed in a side surface of the front frame 8a of the cassette holder 8. In addition, as shown in FIG. 2, the working plate 22 is connected with the chassis 1 through a spring 21 to enable the working plate 22 to always resiliently urge the engaging pin 23 downward in a direction perpendicular to the plane in which the chassis 1 lies. Further, the working plate 22 is provided with a driven portion 22c which extends downward in the direction perpendicular to the plate in which the chassis 1 lies. A lower part of a forward end portion of the ejection lever 4 is formed into a L-shaped slidable portion 25 which is slidable along a lower edge of the chassis 1. An intermediate portion of the ejection lever 4 is formed into a horizontal flat plate portion 4d which abuts on the driven portion 22c of the working plate 22 when the ejection lever 4 is moved forward in the longitudinal direction of the chassis 1. Through such abutting action, the working plate 22 is rotated clockwise in FIG. 2. As shown in FIG. 4, a head plate 28 on which a magnetic head 27 is fixedly mounted is mounted on the chassis 1 so as to be movable rightward and leftward in FIG. 4. As shown in FIGS. 10 and 11, the head plate 28 is always resiliently urged leftward in FIGS. 10 and 11 by means of a spring 29 toward its operative position in which sound reproducing operation is conducted. As shown in FIG. 4, a base portion of a detecting lever 30 is mounted on the chassis 1 through a pivot 31 so as to be swingable in a vertical plane perpendicular to the plane in which the chassis 1 lies. The detecting lever 30 extends rightward in FIG. 4. As is clear from FIG. 1, the detecting lever 30 is disposed in a rearward end portion of the tape player, i.e., in a cassette-tape loading opening of the player, while provided with a tab portion 33 in its base portion. The tab portion 33 of the detecting lever 30 extends downward and is provided with a notched portion 32 in its upper edge portion. The detecting lever 30 is always resiliently urged counter-clockwise by a spring 34 in FIG. 4. As a result, the notched portion 32 of the detecting lever 30 resiliently abuts on a lower surface of the head plate 28 to incline the detecting lever 30 upward so that the notched portion 32 engages with an engaging end portion 28' of the head plate 28, whereby the head plate 28 is held in its inoperative position against the resilient force exerted by the spring 29.

Figure 7:
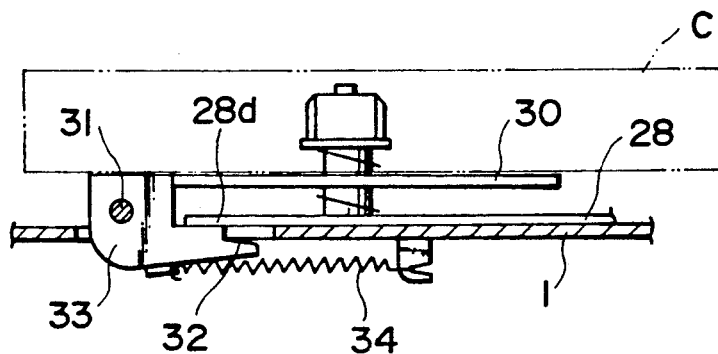
FIG. 7 is a partial front view of the player of FIG. 5.

In inoperative condition of the tape player as shown in FIGS. 1, 2 and 3, when the cassette tape C is loaded into the rear fram 8b of the cassette holder 8 of the player, the engaging pawl 11' of the guide piece 11 engages with one of the reel wheels of the cassette tape C so that the guide piece 11 is moved forward by the thus loaded cassette tape C. In the player, when the guide piece 11 is moved forward, the reversible spring 16 is eventually reversed in action to exert its resilient force on the guide piece 11 so that the cassette tape C is automatically further moved forward into the cassette holder 8 together with the guide piece 11 under the influence of the resilient force exerted by the thus reversed reversible spring 16. As a result, the working projection 18 of the holding member 17 extending across the guide groove 10 of the front frame 8a of the cassette holder 8 is pressed by the cassette tape C so that the holding member 17 is rotated counterclockwise in FIG. 1 against the spring 20 in the horizontal plane parallel with the plane in which the chassis 1 lies, whereby the tongue portion 19 of the holding member 17 is separated from the side wall 1a of the chassis 1. As a result, the front frame 8a of the cassette holder 8 having been kept in a horizontal state through the holding member 17 in its inoperative condition is permitted to rotate clockwise as shown in FIG. 7. At the same time, in FIG. 2, the working plate 22 is rotated counterclockwise by means of a spring 21 to separate the stopping portion 4' of the ejection lever 4 from the engaging portion 22' of the working plate 22, so that the ejection lever 4 is moved rearward to its rearward position by the spring 7. At this time, through engagement of the engaging pin 23 of the working plate 22 with the notched groove 26 of the front frame 8a of the cassette holder 8, the front frame 8a of the cassette holder 8 rotates clockwise as shown in FIG. 6, and the rear frame 8b of the cassette holder 8 is moved downward while kept in a horizontal state. In addition, at this time, as shown in FIG. 4, the detecting lever 30 having been inclined upward is pressed by the cassette tape C to rotate clockwise in FIG. 4. In this case, the side edge portion 28' of the head plate 28 abuts on the notched shoulder portion 32 of the detecting lever 30 to prevent the head plate 28 from moving leftward toward its operative position until the cassette tape C is sufficiently moved downward so as to be correctly positioned in its operative position.

Then, as shown in FIGS. 5 and 6, when the cassette tape is correctly positioned in its operative position, as shown in FIG. 7 the detecting lever 30 is moved to its horizontal position so that the side edge portion 28' of the head plate 28 is released from the notched shoulder portiton 32 of the detecting lever 30 to move leftward to its operative position as shown in FIG. 7.

In a condition shown in FIG. 6, when the ejection lever 4 is pushed or moved forward against the resilient forec exerted by the spring 7, the flat plate portion 4d of the ejection lever 4 abuts on the driven portion 22c of the working plate 22 to rotate the working plate 22 clockwise as shown in FIG. 6, so that the notched groove 26 of the front frame 8a of the cassette holder 8 engages with the engaging pin 23 of the working plate 22, whereby the front frame 8a of the cassette holder 8 is rotated counterclockwise in FIG. 6 and moves to its inoperative position. At this time, the head plate 28 which is interlocked with the ejection lever 4 is moved rightward in FIG. 1 to its inoperative position against the resilient force exerted by the spring 29.

On the other hand, since the spring support 12 is rotated counterclockwise in FIG. 5 through the connecting rod 15 to move the free end portion of the spring support 12 forward when the ejection lever 4 is pushed or moved forward in the longitudinal direction of the chassis 1, the reversible spring 16 is eventually reversed in action to exert its resilient force on the guide piece 11 so as to move rearward the guide piece 11 together with the cassette tape C in the longitudinal direction of the chassis 1. As a result of such rearward movement of the cassette tape C together with the guide piece 11, the working projection 18 of the holding member 17 is released from the cassette tape C so that the holding member 17 is rotated clockwise in FIG. 5 under the influence of the resilient force exerted by the return spring 20. When the front frame 8a of the cassette holder 8 reaches it horizontal position, the tongue portion 19 of the holding member 17 can engage with the side wall 1a of the chassis 1 agains. Consequently, under such circumstances, when the ejection lever 4 is released from a pushing force exerted by the user, the ejection lever 4 returns to its initial or forward position under the influence of the resilient force exerted by the spring 7. At the same time, the flat plate portion 4d of the ejection lever 4 is separated from the driven portion 22c of the working plate 22 which is rotated clockwise in FIG. 6 by means of the spring 21 so that the engaging portion 22' of the working plate 22 engages with the stoppoing portion 4' of the ejection lever 4 to restrict the rearward movement of the ejection lever 4, whereby the cassette holder 8 is kept in a horizontal state by means of the holding member 17. Thus, the cassette holder 8 returns to its operative position shown in FIGS. 1, 2 and 3.

Figure 8:
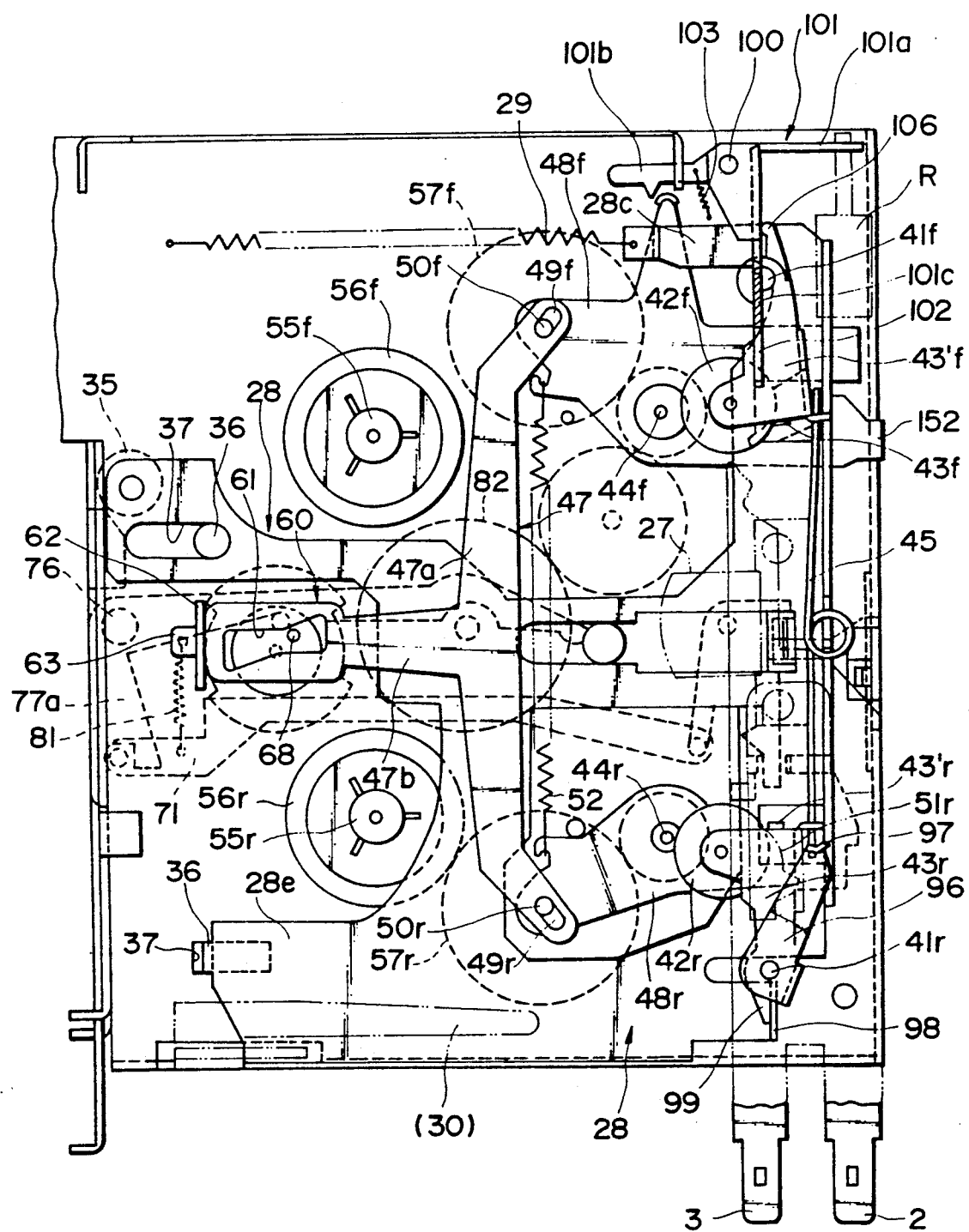
FIG. 8 is a plan view of the player of FIG. 5 in which are eliminated the cassette holder, the quick traverse lever and the rewinding lever.
Figure 9:
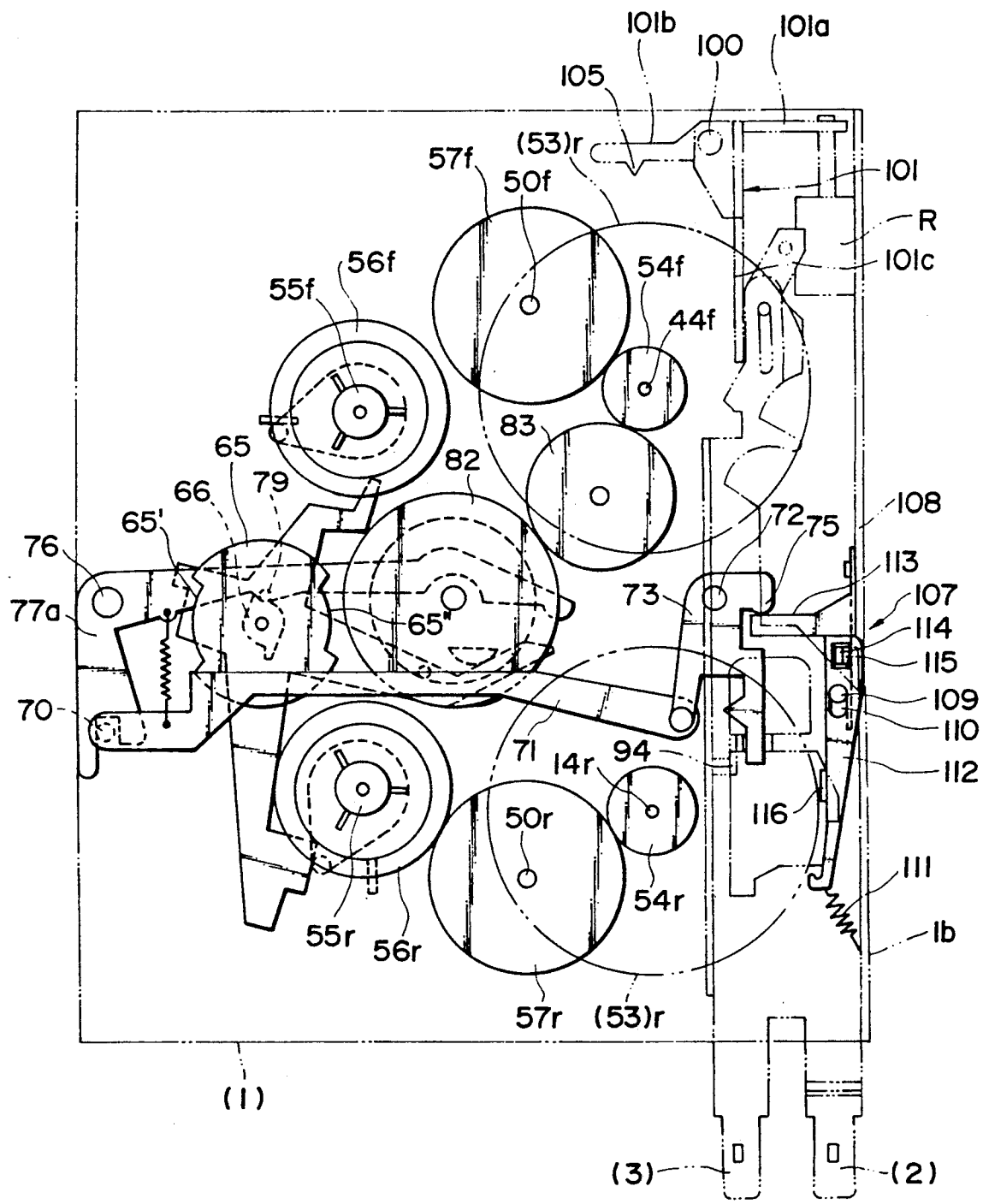
FIG. 9 is a bottom view of the player of FIG. 5, illustrating the drive gear mechanism of the player.

FIG. 8 is a plan view of the cassette tape player of the present invention, illustrating the relationship between the head plate 28 and a channel selector mechanism 60 of the player. FIG. 9 is a bottom view of the cassette tape player of the present invention, mainly illustrating a driving mechanism of the reels of the player. As is clear from FIGS. 10 and 11, the head plate 28 is provided with : a base portion 28a which is disposed under a lower surface of the quick traverse lever 2 and a lower surface of the rewinding lever 3 to extend in the longitudinal direction of the chassis 1, on a central part of which base portion 28a the magnetic head 27 is fixedly mounted; a leg portion 28b which extends from the central part of the base portion 28a toward the side wall 1a of the chassis 1, in which side wall the ejection lever 4 is movable mounted, in a front end of which leg portion 28b a rotary element 35 is provided; a supporting portion 28c extending from a front end of the base portion 28a in parallel with the leg portion 28b; and a bulging portion 28e which extends rearward so as to connect a rearward part of the leg portion 28b with that of the base portion 28a so that a window opening 28d is formed in the head plate 28. The head plate 28 is mounted on the chassis 1 through engagement of its elongated hole 37 with a pin 36 fixed to the chassis 1 so that the head plate 28 is laterally movable rightward and leftward in a direction perpendicular to the longitudinal direction of the chassis 1 in FIG. 10. As shown in FIG. 10, a spring 29 an end of which is fixed to the chassis 1 has the other end thereof mounted on the supporting portion 28c of the head plate 28 to constantly urge the head plate 28 leftward toward the side wall 1a of the chassis 1, i.e., toward the sound reproducing position of the player.

Figure 12A:
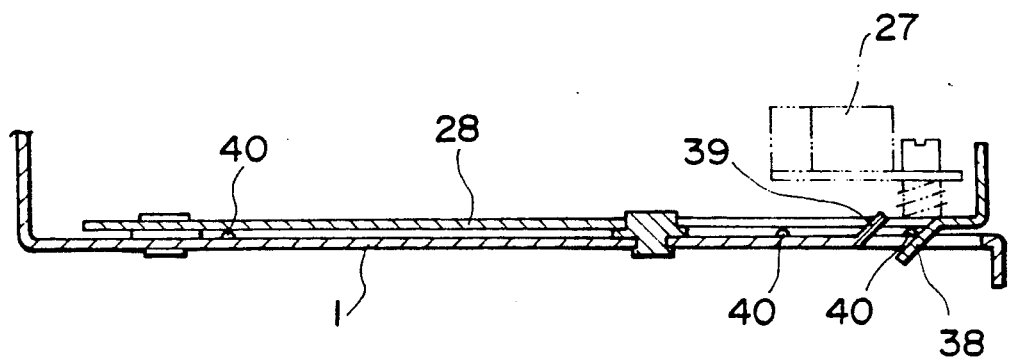
FIG. 12 (a) is a cross-sectional view of an essential part of the player of FIG. 1, illustrating the relationship between the head plate and the chassis of the player in the inoperative condition of the player.
Figure 12B:
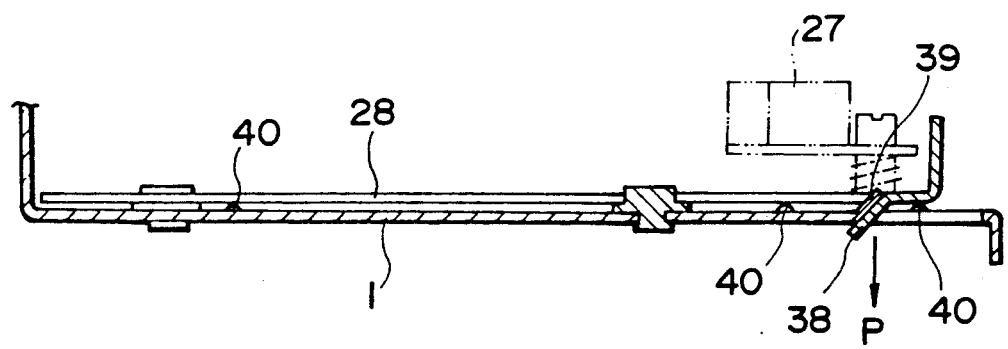

Further, as shown in FIGS. 12 (a) and 12 (b), the head plate 28 is provided with an inclined-downward tab portion 38 in a suitable portion thereof, preferably in the vicinity of the magnetic head 27. On the other hand, as is clear from FIGS. 12 (a) and 12 (b), the chassis 1 is provided with an inclined-upward tab portion 39 which is oppositely disposed from the inclined-downward tab portion 38 of the head plate 28 in the direction perpendicular to the longitudinal direction of the chassis 1. Consequently, when the head plate 28 is moved leftward in FIG. 12 (a) toward its operative position, the inclined-downward tab portion 38 of the head plate 28 abuts on the inclined-upward tab portion 39 of the chassis 1 to move the head plate 28 downward. As a result, as shown in FIG. 12 (b), the head plate 28 is brougnt into a close contact with a plurality of projections 40 of the chassis 1, which projections 40 are provided in an upper surface of the chassis 1, so that the head plate 28 is firmly held in a horizontal state by means of these projections 41 which also serve to reduce a frictional resistance in sliding movement of the head plate 28.

On the other hand, as shown in FIG. 12 (a), in the inoperative position or rightward position of the head plate 28, the inclined-downward tab portion 38 of the head plate 28 is separated from the inclined-upward tab portion 39 of the chassis 1. Under such circumstances, when the cassette tape C is loaded into the cassette holder 8 of the tape player, the head plate 28 is moved leftward toward its operative position under the influence of the resilient force exerted by the spring 29 as shown in FIG. 12 (b), so that the inclined-downward tab portion 38 of the head plate 28 abuts on the inclined-upward tab portion 39 of the chassis 1 so as to be moved downward, whereby the head plate 28 is also moved downward so as to be brougnt into a close contact with the chassis 1. As a result, a lower surface of the head plate 28 firmly abuts on the projections 40 of the chassis 1 under the influence of a force P exerted on the inclined-downward tab portion 38 of the head plate 28 by the inclined-upward tab portion 39 of the chassis 1, so that any lost motion of the head plate 28 relative to the chassis 1 is eliminated.

As in clear from FIGS. 10 and 11, brackets 43f and 43r are rotatably mounted on a forward end portion and a rearward end portion of the head plate 28 through pivots 41f and 41r fixed to the head plate 28 respectively, while provided with pinch rollers 42f and 42r in their free ends, respectively. A torsion coil spring 45 has its central portion coiled and is mounted on the head plate 28. In addition, the spring 45 is provided with opposite straight free end portions which extend substantially in the longitudinal direction of the chassis 1 as shown in FIG. 10 to engage with the brackets 43f and 43r respectively so as to resiliently bias the front bracket 43f clockwise and the rear bracket 43r counterclockwise respectively, whereby the pinch rollers 42f and 42r rotatably mounted on the brackets 43f and 43r respectively resiliently abut on capstan shafts 44f and 44r of the player, respectively. On the other hand, as shown in FIG. 10, the head plate 28 is provided with a front engaging recess 46f and a rear engaging recess 46r. These recesses 46f and 46r of the heat plate 28 engage with an engaging tab portion 43'f of the front bracket 43f and an engaging tab portion 43'r of the rear bracket 43r respectively to restrict rotational movements of these brackets 43f and 43r relative to the heat plate 28 respectively against biasing force exerted on these brackets 43f and 43r by the torsion coil spring 45.

As is clear from FIG. 8 showing the sound reproducing condition of the tape player, a channel selector member 47 of a channel selector mechanism 60 of the player for selecting a desired tape side of the cassette tape C to be sound-reproduced is provided with: a longitudinal portion 47a which extends in the longitudinal direction of the chassis 1 and has its forward and rearward opposite end portions inclined inwardly as viewed in FIG. 8 in a plane parallel to the plane in which the chassis 1 lies; and a central leg portion 47b which extends toward the side wall 1a of the chassis 1 from an intermediate part of the longitudinal portion 47a in a direction perpendicular to the longitudinal direction of the chassis 1. Consequently, the channel selector member 47 assumes a substantially T-shaped plate-like form as shown in FIG. 8. Elongated holes 49f and 49r are formed in the opposite inclined end portions of the longitudinal portion 47a of the channel selector member 47, respectively. On the other hand, as shown in FIG. 8, on the capstan shafts 44f and 44r of the player are rotatably mounted: an intermediate portion of a front rotary plate 48f; and an intermediate portion of a rear rotary plate 48r, respectively. Pivots 50f and 50r are fixedly mounted on these rotary plates 48f and 48r respectively to engage with the elongated holes 49f and 49r of these rotary plates 48f and 48r, respectively. As shown in FIG. 11, these rotary plates 48f and 48r are provided with cam portions 51f and 51r, respectively. The cam portions 51f and 51r of the rotary plates 48f and 48r engage with the engaging tab portions 46'f and 43'r of the brackets 43f and 43r respectively to restrict rotational movements of the rotary plates 48f and 48r, respectively. AS shown in FIG. 8, a tension coil spring 52 has its opposite ends connected with the rotary plate 48f and 48r respectively to bias these plates 48f and 48r counterclockwise and clockwise, respectively.

On the other hand, as shown in FIG. 10, in a condition in which the head plate 28 stays in its inoperative position, the engaging tab portions 43'f and 43'r of the brackets 43f and 43r abut on inner edges of the engaging recesses 46f and 46r of the head plate 28 respectively so that the pinch rollers 42f and 42r are separated from the capstan shafts 44f and 44r of the player, respectively. Consequently, under such circumstances, when the cassette tape C is loaded into the cassette holder 8 of the player, as already described, the head plate 28 moves toward the thus loaded cassette tape C so that the brackets 43f and 43r also move toward the thus loaded cassette tape C. In this case, as shown in FIGS. 8 and 11, the engaging tab portion 43'f of the front bracket 43f rotates clockwise as viewed in FIG. 11 to abut on the cam portion 51f of the rotary plate 48f so that the front pinch roller 42f mounted on the front bracket 43f is prevented from abutting on the front capstan shaft 44f of the player. In this case, in contract with the front pinch roller 42f, the rear pinch roller 44r abuts on the rear capstan shaft 44r since the engaging tab portion 43'r of the rear bracket 43r rotates counterclockwise and does not abut on the rear cam portion 51r of the rear rotary plate 48r.

As shown in FIG. 9, on the capstan shafts 44f and 44r of the player are fixedly mounted: a front flywheel 53f and a rear flywheel 53r respectively, the flywheels 53f and 53r being rotatably driven by an electric motor of the player; and a front drive gear 54f and a rear drive gear 54r, respectively. A front transmission gear 57f and a rear transmission gear 57r are rotatably mounted on the pivots 50f and 50r which are fixedly mounted on the rotary plates 48f and 48r, respectively. The transmission gears 57f and 57r are meshed with the drive gears 54f and 54r respectively, while also meshed with a front reel gear 56f and a rear reel gear 56r, respectively. As shown in FIG. 9, the reel gears 56f and 56r are fixedly mounted on a front reel shaft 55f and a rear reel shaft 55r, respectively. Since the rear transmission gear 57r is meshed with both of the drive gear 44r and the reel gear 56r, the tape of the cassette tape C having been loaded into the cassette holder 8 of the player is wound on one of the reel wheels of the cassette tape C, which one engages with the rear reel shaft 55r of the player.

Figure 13:
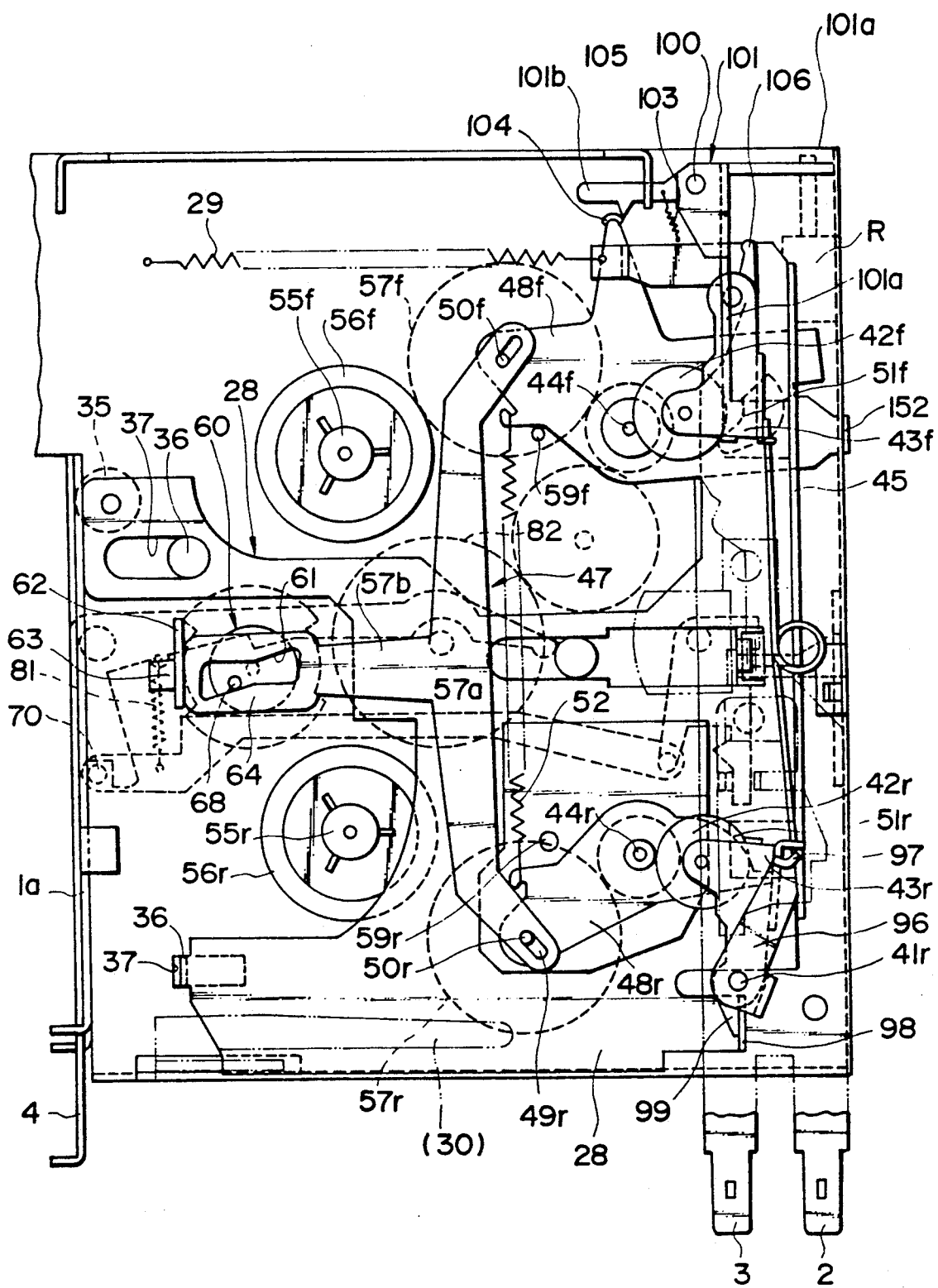
FIG. 13 is a plan view of the player similar to FIG. 8, illustrating the player in the operative condition in which the tape of the cassette tape loaded in the player travels in a direction counter to the traveling direction of the tape in FIG. 8.

In contrast with the above case shown in FIGS. 8 and 11, in FIG. 13, the tape of the cassette tape C is wound on the other of the reel wheels of the cassette tape C, which other engages with the front reel shaft 55f of the player. A change in traveling direction of the tape of the cassette tape C is realized by operation of the channel selector mechanism 60 which is shown in FIG. 13 and moves the channel selector member 47 rightward as viewed in FIG. 13 to realize such change in traveling direction of the tape of the cassette tape C.

Namely, when the channel selector member 47 is moved rightward as viewed in FIG. 13, the pivot 50r having engaged with the elongated hole 49r of the channel selector member 47 is urged rightward to rotate the rear rotary plate 48r counterclockwise against the resilient force exerted thereon by the spring 52, so that cam portion 51r of the rear rotary plate 48r urges the engaging tab portion 43'r of the rear bracket 43r, whereby the rear bracket 43r is rotated clockwise. As a result, the pinch roller 42r mounted on the rear bracket 43r is separated from the corresponding rear capstan shaft 44r. At the same time, since the pivot 50r fixedly mounted on the rear rotary plate 48r is also moved, the rear transmission gear 57r rotatably mounted on such pivot 50r is separated from the rear reel gear 56r.

On the other hand, at this time, the front rotary plate 48f rotates counterclockwise under the influence of the resilient force exerted by the spring 52 so that the cam portion 51f of the front rotary plate 48f is separated from the engaging tab portion 43'f of the front bracket 43f, whereby the front bracket 43f is rotated clockwise under the influence of the resilient force exerted by the torsion coil spring 45 to have its pinch roller 42f abut on the corresponding front capstan shaft 44f. At this time, since the pivot 50f fixedly mounted on the front rotary plate 48f is also moved toward the front reel shaft 55f, the front transmission gear 57f rotatably mounted on the pivot 50f is meshed with the corresponding front reel gear 56f fixedly mounted on the front reel shaft 55f so that the tape of the cassette tape C is wound on the reel wheel of the cassette tape C, which reel wheel engages with the front reel shaft 55f of the player.

Namely, in FIG. 13, each time the channel selector member 47 is moved rightward or leftward in a direction perpendicular to the longitudinal direction of the chassis 1, a traveling direction of the tape of the cassette tape C changes.

In FIG. 13, the reference numerals 59f and 59r denote a front stopper pin and a rear stopper pin, respectively. The stopper pins 59f and 59r regulate rotatable movements of the front rotary plate 48f and the rear rotary plate 48r respectively to enable the transmission gears 57f and 57r to mesh with the reel gears 56f and 56r respectively with appropriate backlash.

Now, the channel selector mechanism 60 shown in FIGS. 8 and 13 will be described in detail.

Figure 14A:
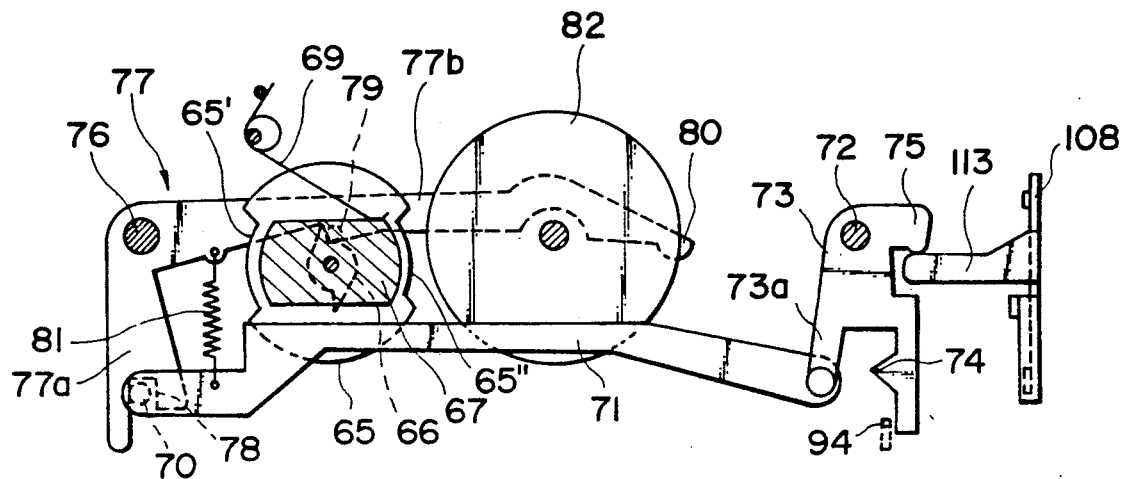
FIGS. 14 (a), 14 (b) and 14 (c) are views illustrating a series of operations of the channel selector mechanism of the player of FIG. 1.
Figure 14B:
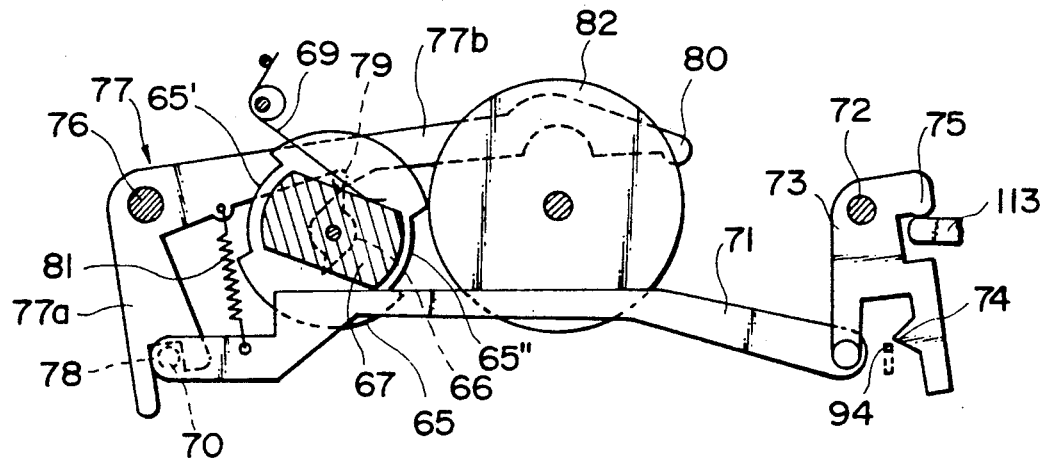
Figure 14C:
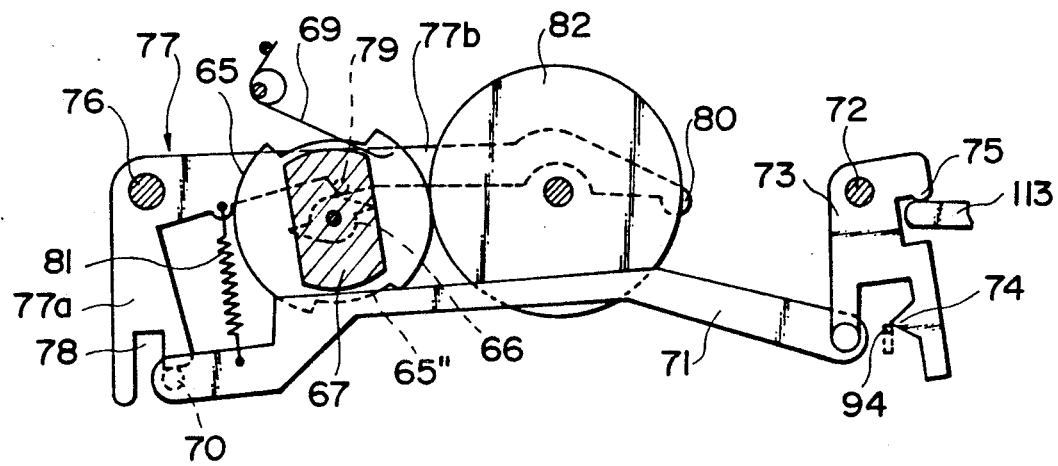

As shown in FIGS. 8, 9, 13 and 14, the channel selector mechanism 60 is constructed of: a plate-like working portion 64 which forms an extension of the leg portion 47b of the channel selector member 47 and is provided with a substantially goggle-shaped cam hole 61 an opening width in a central part of which is narrower than the remaining parts of the cam hole 61, the working portion 64 being further provided with a tongue portion 63 in its left-end portion, which tongue portion 63 engages with a supporting portion 62 of the chassis 1 so as to guide the working portion 64 when the working portion 64 is moved forward and rearward in a direction substantially parallel to the longitudinal direction of the chassis 1, which supporting portion 62 of the chassis 1 extends upward in a direction perpendicular to the plane in which the chassis 1 lies; an intermittent gear 65 which is provided with a pair of recessed portions 65' and 65'' which are diametrically opposed to each other as is clear from FIG. 14 (a); a pawl element 66 which is provided with a pair of pawls which are diametrically opposed to each other, the pawl element 66 being integrally formed with a central portion of the intermittent gear 65; a substantially rectangular piece portion 67 which is also integrally formed with the central portion of the intermittent gear 65, the rectangular piece portion 67 being marked with hatching in FIG. 14 (a) so as to be clearly shown; a working pin 68 which is fixedly mounted on the intermittent gear 65 at a suitable position except a center of the intermittent gear 65, the working pin 68 being received in the cam hole 61 of the of the working portion 64 of the channel selector member 47; a torsion coil spring 69 which is mounted on the chassis 1 while provided with a free end portion which resiliently abuts on a peripheral surface of the piece portion 67 of the intermittent gear 65 to apply an initial torque to the intermittent gear 65; a first rod 71 which assumes an elongated form to extend in a substantially lateral direction perpendicular to the longitudinal direction of the chassis 1 as shown in FIG. 14 (a), an end portion of which first rod 71 is provided with an engaging pin 70 which extends downward in a direction perpendicular to the plane in which the chassis 1 lies; a rotary segment 73 which is provided with a base portion and a free end portion, and has the base portion rotatably mounted on a pivot 72 having been fixed to the chassis 1, and has the free end portion divided into two leg portions 73a and 73b, the leg portion 73a being rotatably connected with the other end portion of the first rod 71, the leg portion 73b being provided with a V-shaped projection 74, the base portion of the rotary segment 73 being provided with a hooked working portion 75; a second rod 77 which assumes a substantially L-shaped form provided with a short leg portion 77a and a long leg portion 77b as shown in FIG. 14 (a), the short leg portion 77a extending in a direction substantially parallel to the longitudinal direction of the chassis 1, the long leg portion 77b extending in a direction substantially perpendicular to the longitudinal direction of the chassis 1, a free end portion of the short leg portion 77a being so formed as to have an engaging recessed portion 78 which engages with the engaging pin 70 of the first rod 71, the long leg portion 77b being provided with an engaging pin 79 in its intermediate portion while provided with an oblique abutting portion 80 in its front end portion as shown in FIG. 14 (a), the engaging pin 79 of the second rod 77 engaging with the pawls of the pawl element 66; a spring 81 which is interposed between the first rod 71 and the second rod 77 to urge the free end portion of the first rod 71 toward the pivot 76 of the second rod 77; and a working gear 82 which is meshed with the intermittent gear 65, the working gear 82 being rotatably mounted on the chassis 1.

As shown in FIGS. 8 and 11, in a first selector position in which the intermittent gear 65 having rotated through an angle of 180° stops its rotational movement and the tape of the cassette tape C has been wound on its reel wheel engaging with the rear reel shaft 56r of the player, when the rewinding lever 3 is pushed forward solely or together with the quick traverse lever 2 against the resilient forces exerted by their return springs 5 and 6 to rotate the rotary segment 73 counterclockwise on the pivot 72 in FIG. 14 (a), the first rod 71 is moved rightward as shown in FIG. 14 (b) so that the second rod 77 is rotated counterclockwise on the pivot 76 since the engaging pin 70 of the first rod 71 engages with the engaging recessed portion 78 of the second rod 77. Consequently, the engaging pin 79 of the second rod 77 is released from one of the pawls of the pawl element 66 to permit the intermittent gear 65 to rotate. As a result, as shown on FIG. 14 (b), the intermittent gear 65 rotates clockwise under the influence of the resilient force exerted by the torsion coil spring 69 which resiliently urges the piece portion 67 of the intermittent gear 65. After completion of such initial rotation, the intermittent gear 65 meshes with the working gear 82 as shown in FIG. 14 (c). On the other hand, as shown in FIG. 9, the working gear 82 is rotatably driven by the front drive gear 54f of the flywheel 53f through an intermediate gear 83, the flywheel 53f being always driven by an electric drive motor (not shown). Consequently, the intermittent gear 65 is rotatably driven by the thus driven intermediate gear 83 after completion of the above initial rotation thereof. As the intermittent gear 65 rotates, the piece portion 67 of the intermittent gear 65 urges the first rod 71 against the resilient force exerted by the spring 81 as shown in FIG. 14 (b). Therefore, the engaging pin 70 of the first rod 71 is separated from the engaging recessed portion 78 of the second rod 77 to abut on an end edge portion of the short leg portion 77a of the second rod 77 as shown in FIG. 14 (c). At the same time, the second rod 77 returns to its initial position under the influence of the resilient force exerted by the spring 81 so that the engaging pin 79 of the second rod 77 abuts on the peripheral surface of the pawl element 66 of the intermittent gear 65. After that, the intermittent gear 65 rotates through an angle of substantially 180° to have its recessed portion 65' correspond to the working gear 82 so that the intermittent gear 65 is separated from the working gear 82, whereby the engaging pin 79 of the second rod 77 abuts on the pawl of the pawl element 66 of the intermittent gear 65 to keep the intermittent gear 65 stationary in a second selector position. As is clear from the above description, each time the intermittent gear 65 rotates through an angle of substantially 180°, the channel selector mechanism 60 alternates between a condition shown in FIG. 8 and that shown in FIG. 13 to realize a change in traveling direction of the tape of the cassette tape C. Namely, as shown in FIG. 8, in the first selector position, the working pin 68 of the intermittent gear 65 abuts on one inner edge of the cam hole 61 of the channel selector member 47 to move the member 47 forward in the longitudinal direction of the chassis 1. On the other hand, as shown in FIG. 13, in the second selector position, the working pin 68 of the intermittent gear 65 abuts on the other inner edge of the cam hole 61 of the channel selector member 47 to move the member 47 rearward in the longitudinal direction of the chassis 1 to realize a change in traveling direction of the tape of the cassette tape C, the other inner edge of the cam hole 61 being diametrically opposed to the above one inner edge of the cam hole 61.

Incidentally, in the above embodiment of the present invention, since the piece portion 67 integrally formed with the intermittent gear 65 causes the engaging pin 70 of the first rod 71 to separate from the engaging recessed portion 78 of the second rod 77, the engaging pin 79 of the second rod 77 abuts on the pawl of the pawl element 66 of the intermittent gear 65 each time the intermittent gear rotates through an angle of substantially 180°. Consequently, in operation, even when the user excessively pushes forward both of the quick traverse lever 2 and the rewinding lever 3 in the longitudinal direction of the chassis 1, it is possible for the engaging pin 79 of the second rod 77 intermittently engaging with the pawl element 66 to realize intermittent half turns of the intermittent gear 65, whereby it is possible to ensure the channel selector mechanism 60 a correct operation.

On the other hand, as shown in FIGS. 15 and 16, the quick traverse lever 2 and the rewinding lever 3 are provided with narrow control portions 2a and 3a, respectively. These control portions 2a and 3a constituting rearward extensions of the levers 2 and 3, respectively. The levers 2 and 3 are provided with narrow stabilizing portions 2b and 3b, respectively. These stabilizing portions 2b and 3b extend rearward in parallel to the control portions 2a and 3a respectively, and are spaced therefrom, respectively. In assembling, the quick traverse lever 2 is arranged in overlying relationship to the rewinding lever 3 so that the control portion 2a and the stabilizing portion 2b of the quick traverse lever 2 are adjacent to the stabilizing portion 3b and the control portion 3a of the rewinding lever 3, respectively. On the other hand, forward end portions of these levers 2 and 3 constitute supporting portions 2h and 3h, respectively. The levers 2 and 3 are also provided with narrow elongated working portions 2c and 3c, respectively. These working portions 2c and 3c is provided with curved first recessed portions 2d and 3d respectively, which portions 2d and 3d open rightward as viewed in FIGS. 15 and 16. On the other hand, the supporting portions 2h and 3h of the levers 2 and 3 are provided with: engaging projections 2e and 3e in left sides of these portions 2h and 3h, respectively; and curved second recessed portions 2g and 3g in right sides of these portions 2h and 3h, respectively. As shown in FIG. 15, the quick traverse lever 2 is provided with an elongated rib portion 2i in a left side of the lever 2, which rib portion 2i extends in a longitudinal direction of the lever 2 and projects upward in a direction perpendicular to the plane in which the chassis 1 lies. On the other hand, as shown in FIG. 16, the rewinding lever 3 is provided with a elongated rib portion 3i in a left side of the lever 3, which rib portion 3i extends in a longitudinal direction of the lever 3 and projects downward in a direction perpendicular to the plane in which the chassis 1 lies. As is clear from the above description, each of the levers 2 and 3 assumes an elongated plate-like form. As shown in FIGS. 1 and 5, in assembling, the quick traverse lever 2 is arranged in overlying relationship to the rewinding lever 3. Consequently, rearward end portions of the thus arranged levers 2 and 3 are slidably supported by a bent portion 85 of the sub-chassis 1c, respectively. The sub-chassis 1c is fixed to a right-side portion of the chassis 1. The bent portion 85 of the sub-chassis 1c constitutes a rearward end portion of the sub-chassis 1c and projects upward in a direction perpendicular to the plane in which the chassis 1 lies. On the other hand, forward end portions of the levers 2 and 3 are provided with elongated holes 87 and 87, respectively. These elongated holes 87 and 87 engage with the pin 86 of the front bracket 43f so as to be slidably supported thereby. As is clear from FIG. 1, the levers 2 and 3 are constantly urged rearward resiliently under the influence of the resilient force exerted by the return springs 5 and 6, respectively.

Further, the quick traverse lever 2 and the rewinding lever 3 are provided with working windows 88 and 88' in their intermediate portions, respectively. In rearward half areas of right side edge portions of the working windows 88 and 88' of the levers 2 and 3, these working windows 88 and 88' are sequentially provided with: first portions 89 and 89' respectively, which first portions 89 and 89' incline rightward and rearward; second portions 90 and 90' which constitute hooked recesses, respectively; and third portions 91 and 91' which extend forward and rearward in the longitudinal directions of the levers 2 and 3, respectively. Formed adjacent to the third portions 91 and 91' are: sloping edge portions 92 and 92' of the levers 2 and 3, respectively. These sloping edge portions 92 and 92' inclines leftward and rearward. As shown in FIGS. 15 and 16, the levers 2 and 3 are further provided with recessed portions 93 and 93', respectively. These recessed portions 93 and 93' are so formed as to be adjacent to the sloping edge portions 92 and 92' of the levers 2 and 3, respectively. In addition, as shown in FIG. 15, the supporting portion 2h of the quick traverse lever 2 is provided with a bulging portion 2j in a right side of the elongated hole 87 of the lever 2. On the other hand, as shown in FIG. 16, the rewinding lever 3 is provided with: a working portion 94 which cooperates with the V-shaped projection 74 of the rotary segment 73 as shown in FIG. 14 (c), the working portion 94 is formed in a position adjacent to an intermediate portion of a left side edge portion of the working window 88' of the lever 3 so as to project rightward; and a working pin 95 which is disposed in a front end part of the supporting portion 3h of the lever to project downward in a direction perpendicular to the plane in which the chassis 1 lies.

Figure 27:
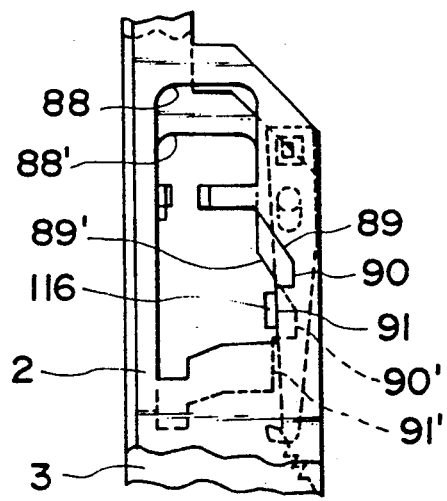

As shown in FIGS. 8, 13 and 27, a swingable lever 96 is rotatably mounted on a rearward end portion of the chassis 1 together with the rear bracket 43r through the pivot 41r. In operation, when the quick traverse lever 2 or the rewinding lever 3 is moved forward, the swingable lever 96 is rotated counterclockwise to move the head plate 28 rightward against the resilient force exerted by the spring 29. Further, the swingable lever 96 is provided with: a projected portion 97 which cooperates with the sloping edge portions 92 and 92' of the levers 2 and 3 respectively so as to rotate the swingable lever 96 counterclockwise; and a pawl portion 99 which is formed in a rearward end portion of the swingable lever 96 to abut on a rib portion 98 of the head plate 28, the rib portion 98 being formed in a rightward end portion of the head plate 28 to project upward in a direction perpendicular to the plane in which the chassis 1 lies.

I operation, as shown in FIG. 17, in a condition in which the head plate 28 has been moved to its operative position or rightward position and the levers 2 and 3 are released from external pushing forces, when the rewinding lever 3 is pushed or moved forward against the resilient force exerted by the return spring 6 shown in FIG. 1, as is clear from FIG. 14 (c), the working portion 94 of the rewinding lever 3 engages with the V-shaped projection 74 of the rotary segment 73 to rotate the segment 73 counterclockwise. Consequently, as already described, the thus rotated rotary segment 73 operates the channel selector mechanism 60 shown in FIG. 8 to realize a change in traveling direction of the tape of the cassette tape C. At this time, as shown in FIG. 18, the sloping edge portion 92' of the rewinding lever 3 abuts on the projected portion 97 of the swingable lever 96 to rotate the lever 96 counterclockwise in FIG. 17 so that the pawl portion 99 of the swingable lever 96 moves the rib portion 98 of the head plate 28 rightward as shown in FIG. 18, whereby the head plate 28 is moved to its inoperative position in which no sound reproducing operation is conducted.

Figure 19:
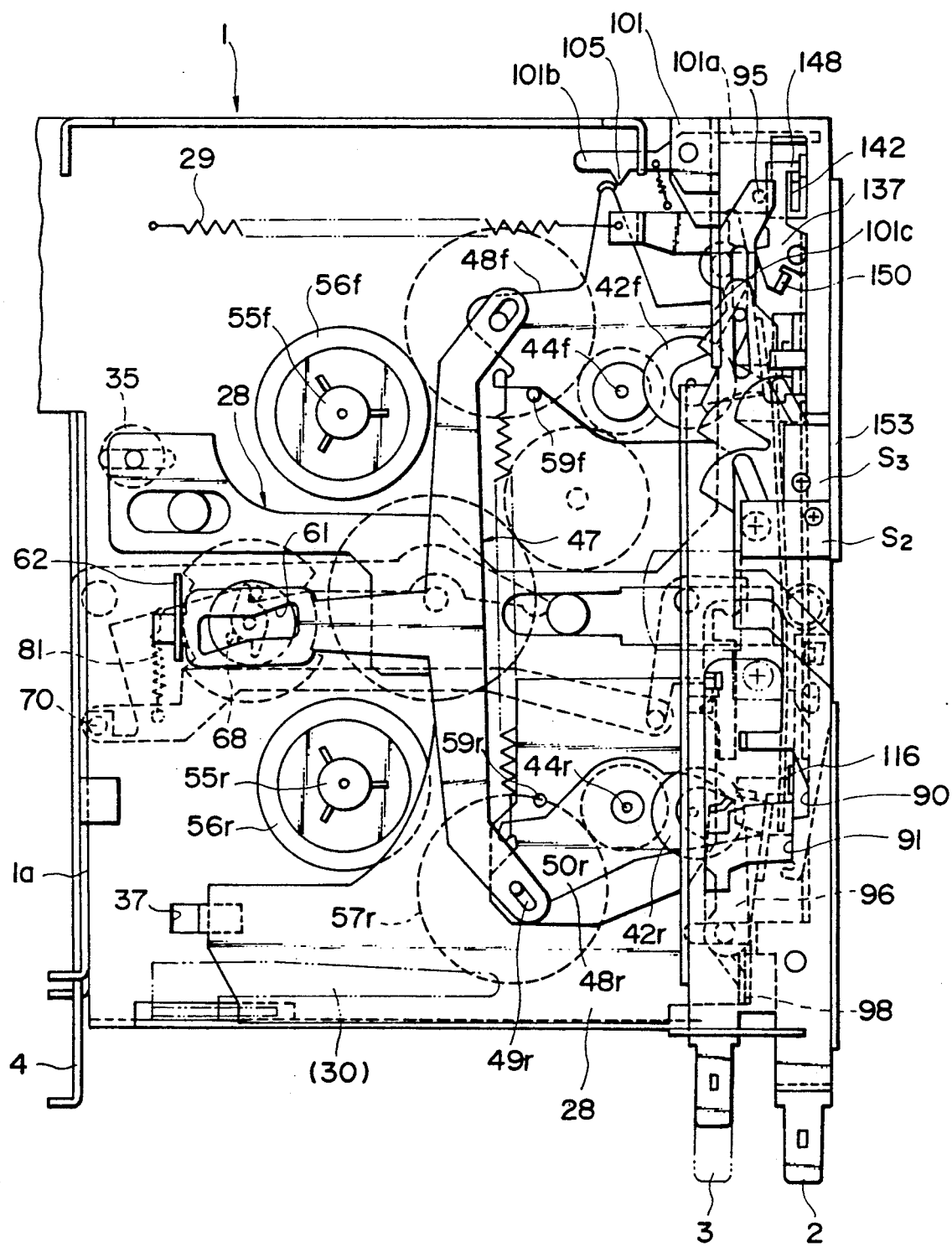
FIG. 19 is a plan view of the player similar to FIG. 8, illustrating the rewinding operation of the cassette tape of the player of FIG. 1.
Figure 20:
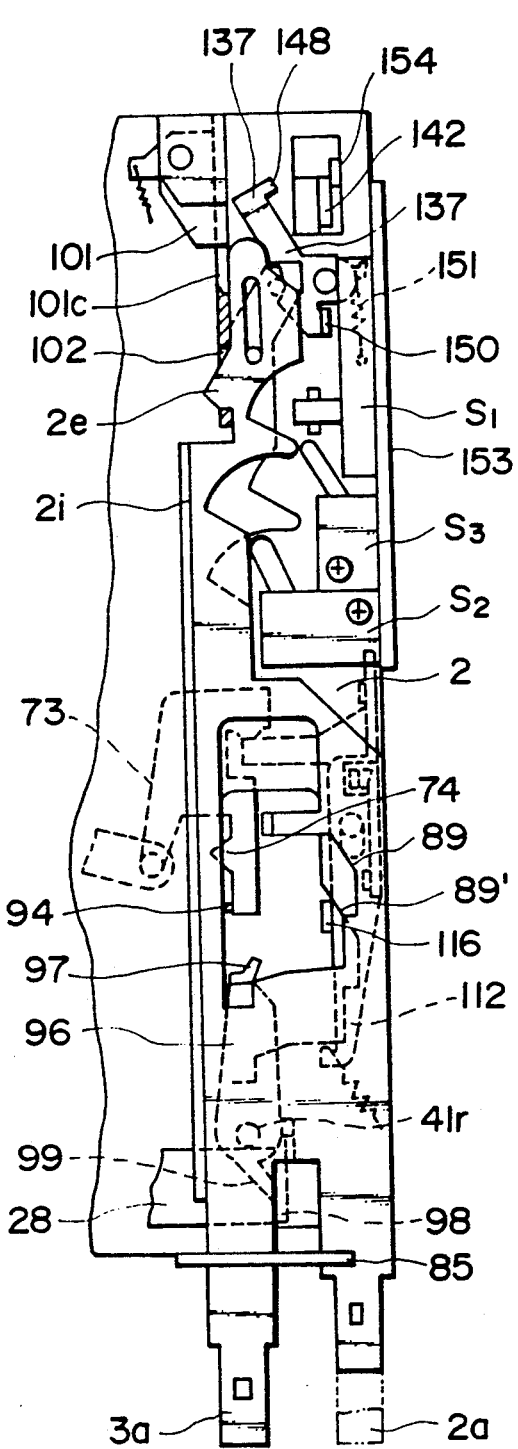
FIG. 20 is a plan view of the player similar to FIG. 17, illustrating the quick traverse operation of the cassette tape of the player of FIG. 1.

As shown in FIG. 10, when the head plate 28 is moved to its inoperative position, the engaging recesses 46f and 46r of the head plate 28 engage with the engaging portions 43f' and 43r' of the brackets 43f and 43r respectively, so that the front brackets 43f is rotated counterclockwise while the rear brackets 43r is rotated clockwise, whereby the pinch rollers 42f and 42r of the brackets 43f and 43r are separated from the corresponding capstan shafts 44f and 44r, respectively. As a result, the tape of the cassette tape C is released from loads (having been applied thereto) to realize a quick traverse action thereof as shown in FIG. 19. In the above operation having been described in detail, the rewinding lever 3 is pushed or moved forward to operate the channel selector mechanism 60 and simultaneously to move the head plate 28 rightward in FIG. 19 to its inoperative position so that the quick traverse operation of the cassette tape C is accomplished in a reverse traveling direction of the cassette tape C. On the other hand, in a condition shown in FIG. 17 in which the tape of the cassette tape C loaded in the player travels in its forward traveling direction in operation, in case that it is required to accomplish a quick traverse operation of the cassette tape C without changing its traveling direction, the quick traverse lever 2 is pushed or moved forward against the resilient force exerted by the spring 5. As for the quick traverse lever 2, since this lever 2 is not required to operate the channel selector mechanism 60 in contrast with the rewinding lever 2, the quick traverse lever 2 is not provided with that corresponding to the working portion 94 of the rewinding lever 3, which portion 94 cooperates with the V-shaped projection 74 of the rotary segment 73 employed in the channel selector mechanism 60. Consequently, when the quick traverse lever 2 is pushed or moved forward against the resilient force exerted by the spring 5, as shown in FIG. 20, the sloping edge portion 92 of the quick traverse lever 2 abuts on the projected portion 97 of the swingable lever 96 as is in the case of the rewinding lever 3 to rotate the swingable lever 96 counterclockwise. As a result, the thus rotated swingable lever 96 moves the head plate 28 rightward toward the inoperative position of the head plate 28 as shown in FIG. 20 to permit the cassette tape C to realize its quick traverse action in the forward traveling direction thereof.

In the above operation, it is possible for the user of the player to push or move forward both of the quick traverse lever 2 and the rewinding lever 3 and to keep these levers 2 and 3 in their forward positions against the resilient forces exerted thereon by the return springs 5 and 6. However, preferably, the levers 2 and 3 are automatically held in their forward positions by suitable locking means. The embodiment of the present invention described above is provided with such locking means.

As is clear from FIGS. 8 and 9, an engaging member 101 is rotatably mounted on the chassis 1 through a pivot 100 in a position in front of the levers 2 and 3. The engaging member 101 is provided with: a pair of lateral leg portions 101a and 101b which extent in a lateral direction substantially perpendicular to the longitudinal direction of the chassis 1; and a longitudinal leg portion 101c extending in a direction substantially parallel to the longitudinal direction of the chassis 1. The longitudinal leg portion 101c of the engaging member 101 also extends upward in a direction perpendicular to the plane in which the chassis 1 lies and is provided with an engaging hole 102 which opens in the lateral direction perpendicular to the longitudinal direction of the chassis 1 as viewed ini FIG. 8. In operation, when the levers 2 and 3 are pushed or moved forward, substantially V-V-shaped engaging projections 2e and 3e formed in the forward end portions of the levers 2 and 3 respectively engage with the engaging hole 102 of the engaging member 101 so that the levers 2 and 3 are held in their forward positions.

On the other hand, it is possible for the user of the tape player to release the lever 2 or 3 having held in its forward position from the forward position by pushing or moving forward the lever 2 or 3 having stayed in its inoperative or rearward position. Namely, for example, as shown in FIG. 9, in case that the quick traverse lever 2 has stayed in the rearward position, when the quick traverse lever 2 is pushed or moved forward, the engaging projection 2e of the quick traverse lever 2 abuts on a lower end of the longitudinal leg portion 101c of the engaging member 101 to rotate the member 101 clockwise against the resilient force exerted by a return spring 103 shown in FIG. 13, the return spring 103 being interposed between the left lateral leg portion 101b of the engaging member 101 and a rearward portion of the chassis 1 spaced apart from the leg portion 101b to constantly urge the engaging member 101 counterclockwise as is clear from FIG. 13. A similar action to the above is accomplished by the engaging projection 3e of the rewinding lever 3 when the rewinding lever 3 is pushed or moved forward in a condition in which the rewinding lever 3 has stayed in its rearward position and the quick traverse lever 2 has been held in its forward position. Namely, in this case, the engaging projection 3e of the rewinding lever 3 abuts on the lower end of the longitudinal leg portion 101c of the engaging member 101 to rotate the member 101 clockwise against the resilient force exerted by the return spring 103, so that the engaging projection 2e having engaged with the engaging hole 102 of the engaging member 101 is separated from the engaging hole 102 to release the quick traverse lever 2 from its forward position, whereby the quick traverse lever 2 is moved move rearward to its in operative or rearward position under the influence of the resilient force exerted by the return spring 5 shown in FIG. 5.

Incidentally, the quick traverse lever 2 or the rewinding lever 3 is automatically released from its forward position when the tape of the cassette tape C is completely wound on any one of the reel wheels of the cassette tape C.

Namely, as shown in FIG. 8, in the first selector position of the channel selector mechanism 60, when the tape of the cassette tape C is completely wound on any one of the reel wheels of the cassette tape C, as described later in detail, the intermittent gear 65 begins to rotate so that the channel selector member 47 moves to the second selector position, whereby a top portion of a triangular working projection 104 of the front rotary plate 48f shown in FIG. 13 engages with the V-shaped projection 105 of the left lateral leg portion 101b of the engaging member 101 to rotate the member 101 clockwise against the resilient force exerted by the return spring 103, so that the quick traverse lever 2 and/or the rewinding lever 3 are automatically released from their forward positions.

After completion of a half turn of the intermittent gear 65, i.e., after the channel selecting operation of the channel selector mechanism 60 is conducted, as shown in FIG. 13, the triangular working projection 104 of the front rotary plate 48f passes through the V-shaped projection 105 of the engaging member 101 so as to disposed in a position adjacent to a left side of the V-shaped projection 105 of the engaging member 101 so that the engaging member 101 is rotate counterclockwise to return to its initial position under the influence of the resilient force exerted by the return spring 103. As a result, the quick traverse lever 2 and/or the rewinding lever 3 are held in their forward positions by the engaging member 101.

Incidentally, under such circumstances, when the ejection lever 4 is pushed or moved forward to eject the cassette tape C from the tape player, the quick traverse lever 2 and/or the rewinding lever 3 are released from their forward position since the front bracket 43f is provided with a projected portion 106 which pushes the longitudinal leg portion 101a of the engaging member 101 leftward as shown in FIG. 1 when the head plate 28 is moved rightward as shown in FIG. 10 to rotate the front bracket 43f counterclockwise.

As shown in FIG. 10, when the ejection lever 4 is pushed or moved forward to move rightward the head plate 28 to its inoperative position, as already described, the engaging portions 43'f and 43'r of the brackets 43f and 43r carrying the pinch rollers 42f and 42r respectively engage with the engaging recesses 46f and 46r of the head plate 28 respectively to rotate the front bracket 43f counterclockwise on its pivot 41f and the rear bracket 43r clockwise on its pivot 41r respectively, whereby the projected portion 106 of the front bracket 43f pushes the longitudinal leg portion 101c of the engaging member 101 leftward in FIG. 13 against the resilient force exerted by the return spring 103. As a result, the engaging member 101 is rotated clockwise against the resilient force exerted by the return spring 103 to release the quick traverse lever 2 and/or the rewinding lever 3 from their forward positions.

Now, relationship between these levers 2, 3 and an actuating mechanism 107 (shown in FIG. 9) for operating the channel selector mechanism 60 will be described in detail.

As is clear from FIG. 9, the actuating mechanism 107 is constructed of: a slidable segment 108 which is slidably mounted on an inner surface of a right side wall 1b of the chassis 1 so as to be movable forward and rearward in the longitudinal direction of the chassis 1; and an elongated swingable lever 112 which is provided with an elongated hole 110 which receives a pin 109 fixed to an upper surface of the sub-chassis 1c, which swingable lever 112 is movable forward and rearward in the longitudinal direction of the chassis 1 while swingable in a horizontal plane parallel to the plane in which the chassis 1 lies, the swingable lever 112 being biased counterclockwise on the pin 109 fixed to the sub-chassis 1c. The slidable segment 108 is provided with: a lateral arm portion 113 extending leftward in a direction perpendicular to the longitudinal direction of the chassis 1, which arm portion 113 cooperates with the working portion 75 of the rotary segment 73; and a projected portion 114 extending upward in a direction perpendicular to the plane in which the chassis 1 lies. The swingable lever 112 is provided with: an engaging hole 115 which loosely receives the projected portion 114 of the slidable segment 108 therein, the swingable lever 112 being rotatable on the pin 109 while movable forward and rearward relative to the slidable segment 108 as shown in FIG. 9; and working segment portion 116 which extends upward in a direction perpendicular to the plane in which the chassis 1 lies, which working segment portion 116 abuts on any of the first portions 89 and 89', second portions 90 and 90' and the third portions 91 and 91' of the levers 2 and 3, respectively.

In a condition shown in FIG. 17 in which: the head plate 28 is held in its operative position, i.e., leftward position; the quick traverse lever 2 and the rewinding lever 3 are held in their rearward positions under the influence of the return springs 5 and 6, respectively; and the working segment portion 116 of the elongated swingable lever 112 abuts on the first portions 89 and 89' of the levers 2 and 3, respectively, when the rewinding lever 3 is pushed or moved forward against the resilient force exerted by the return spring 6 as shown in FIG. 18 in order to rewind the tape of the cassette tape C in quick traverse operation thereof, the first portion 89' of the rewinding lever 3 is separated from the working segment portion 116 of the swingable lever 112. However, at this time, since the first portion 89 of the quick traverse lever 2 still abuts on the working segment portion 116 of the swingable lever 112, the lever 112 still stays in its inoperative position during such forward movement of the rewinding lever 3. On the other hand, in the forward movement of the rewinding lever 3, as already described with reference to FIG. 17, the projected portion 97 of the swingable lever 96 abuts on the sloping edge portion 92' of the thus moved rewinding lever 3 to rotate the swingable lever 96 counterclockwise, so that the pawl portion 99 of the swingable lever 96 pushes the rib portion 98 of the head plate 28 rightward as shown in FIG. 18 to move rightward the head plate 28 to its inoperative position or rightward position. At this time, as is clear from FIG. 18, since the V-shaped projection 74 of the rotary segment 73 engages with the working portion 94 of the rewinding lever 3 and is pushed rightward thereby to rotate the rotary segment 73 counterclockwise as shown in FIG. 14 (b), the channel selecting operation of the channel selector mechanism 60 is conducted to realize a change in traveling direction of the tape of the cassette tape C so that the tape is rewound on one of the reel wheels of the cassette tape C in quick traverse operation thereof.

When the rewinding lever 3 is sufficiently moved forward in the longitudinal direction of the chassis 1, the engaging projection 3e of the rewinding lever 3 is received in the engaging hole 102 of the engaging member 101 so that the rewinding lever 3 is held in its forward position by the engaging member 101 against the resilient force exerted by the return spring 6 shown in FIG. 1.

As is clear from FIG. 20, operation similar to the above is also conducted when the quick traverse lever 2 is pushed or moved forward against the resilient force exerted by the return spring 5 shown in FIG. 1 in a condition shown in FIG. 17 in order to conduct a quick traverse operation of the tape of the cassette tape C in the forward traveling direction of the tape. In this case, however, the channel selector mechanism 60 is not operated.

Now, the quick traverse lever 2 is pushed or moved forward simultaneously with the rewinding lever 3 in a condition shown in FIG. 17 in order to reverse only a traveling direction of the tape of the cassette tape C loaded in the player, i.e., in order to conduct the channel selecting operation of the player.

Figure 21:
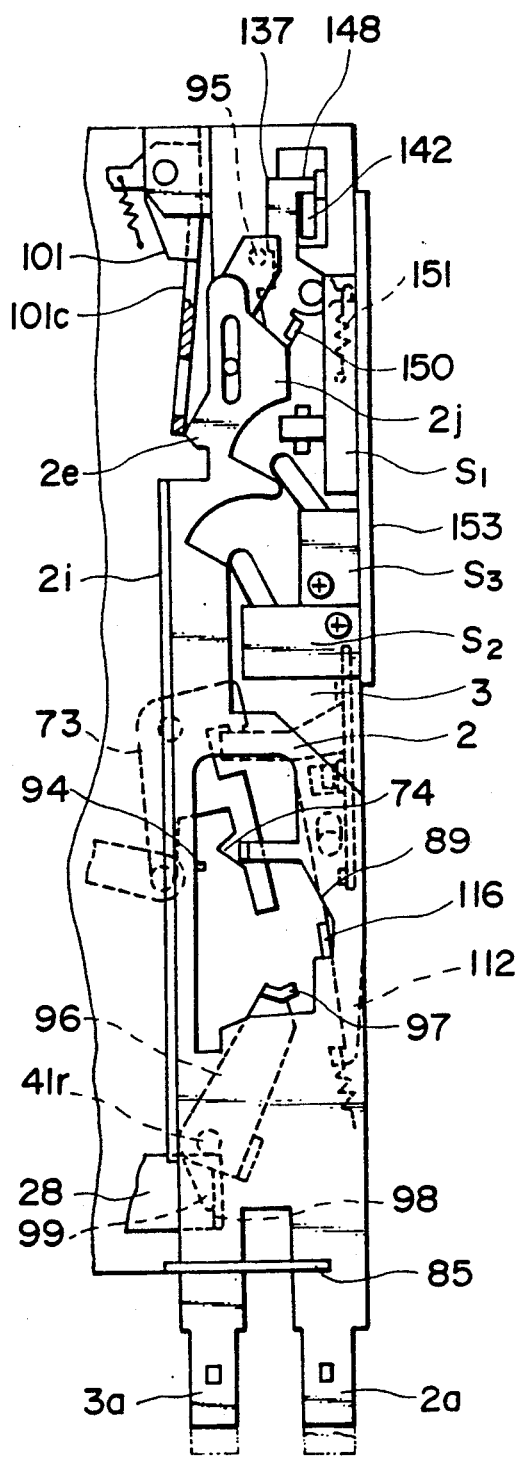
FIG. 21 is a plan view of the player similar to FIG. 17, illustrating a condition in which the quick traverse lever of the player is moved forward simultaneously with the rewinding lever of the player of FIG. 1.

As a result of the above simultaneous pushing operations of the levers 2 and 3, as shown in FIG. 21, the first portion 89 of the quick traverse lever 2 is separated from the working segment portion 116 of the swingable lever 96 simultaneously with the first portion 89' of the rewinding lever 3. Consequently, following to the first portions 89 and 89', the second portions 90 and 90' of these levers 2 and 3 engage with the working segment portion 116 of the swingable lever 112, respectively. Under such circumstances, when these levers 2 and 3 are further moved forward, the swingable lever 112 is moved forward by these levers 2 and 3 against the resilient force exerted by the spring 111 since the working segment portion 116 of the swingable lever 112 still engages with both of the second portions 90 and 90' of these levers 2 and 3. As a result of such forward movement of the swingable lever 112, the projected portion 114 of the slidable segment 108 is pushed forward by the thus moved swingable lever 112 since the projected portion 114 has been received in the engaging hole 115 of the swingable lever 112 as shown in FIG. 9, so that the slidable segment 108 moves forward in the longitudinal direction of the chassis 1 as shown in FIGS. 14 (a) and 14 (b). Consequently, the working portion 75 of the rotary segment 73 is pushed forward by the arm portion 113 of the thus moved slidable segment 112 to cause the rotary segment 73 to rotate counterclockwise as shown in FIGS. 14 (b) and 21, so that the channel selector mechanism 60 shown in FIG. 8 is operated to reverse the tape of the cassette tape C in its traveling direction. In a condition shown in FIG. 21: since the forward movements of the levers 2 and 3 are restricted in stroke by the elongated hole 110 of the swingable lever 112, these levers 2 and 3 are not held in their forward positions by the engaging member 101; and the head plate 28 is not moved to its inoperative position or rightward position shown in FIG. 10. In this case, when the user stops pushing operation of the levers 2 and 3, these levers simultaneously return to their rearward positions under the influence of the resilient forces exerted by the return springs 5 and 6 shown in FIG. 1.

Figure 22:
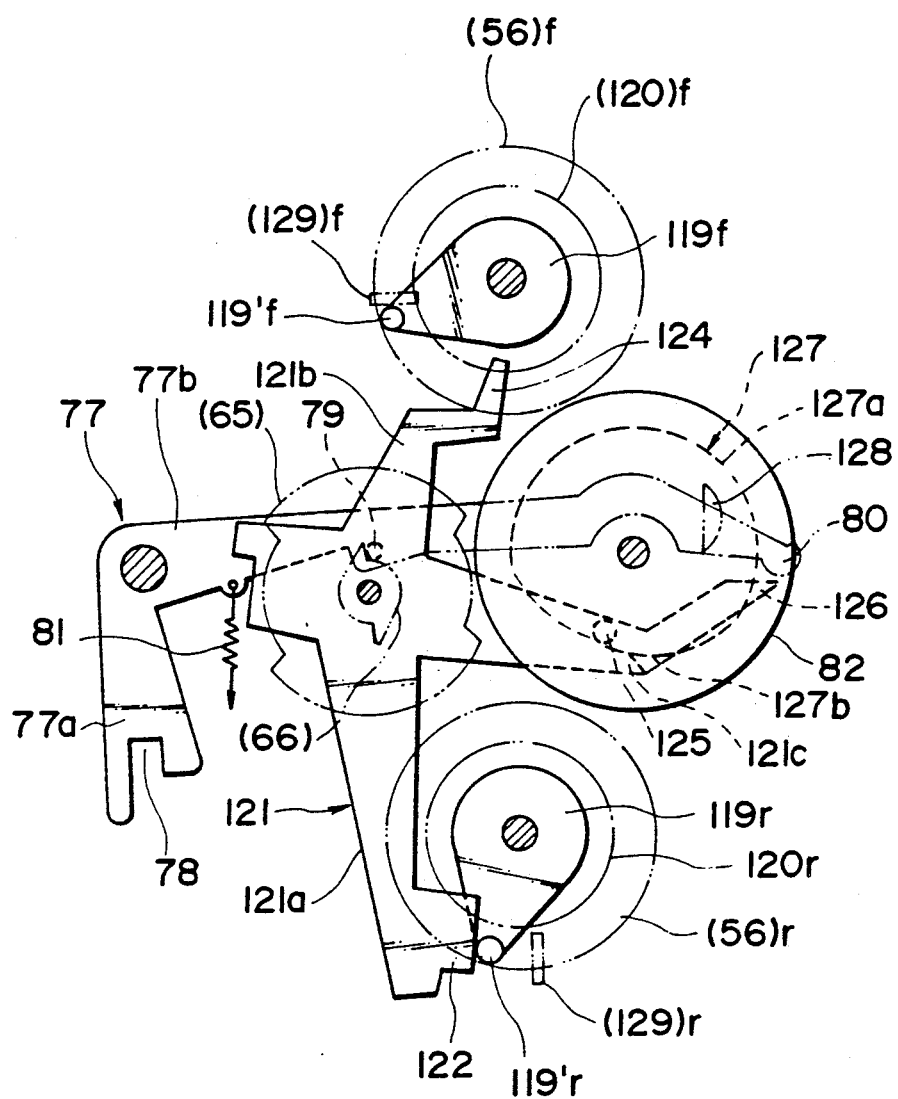
FIGS. 22 through 25 are a series of plan views of the tape end detecting mechanism of the player of FIG. 1, illustrating its operation.

Now, with reference to FIGS. 22 to 25, a detecting mechanism, which operates the channel selector mechanism 60 when the tape of the cassette tape C loaded in the player is completely wound on one of the reel wheels of the cassette tape C to reach its end, will be described in detail. The reference numerals 119$f$ and 119$r$ denote a front rotary lever and a rear rotary lever, respectively. As shown in FIG. 22, these rotary levers 119$f$ and 119$r$ are rotatably and coaxially mounted on the reel gears 56$f$ and 56$r$ respectively, while frictionally and coaxially engaged with lower surfaces of a front reel base 120$f$ and a rear reel base 120$r$, respectively. Consequently, the rotary levers 119$f$ and 119$r$ frictionally driven by the reel gears 56$f$ and 56$r$ respectively as the reel gears 56$f$ and 56$r$ rotate together with the reel bases 120$f$ and 120$r$, respectively. On the other hand, as shown in FIG. 22, the reference numeral 121 denotes a swingable member which is rotatably and coaxially mounted on a shaft of the intermittent gear 65 while provided with: a first leg portion 121$a$ extending toward the rear reel gear 56$r$; a second leg portion 121$b$ extending toward the front reel gear 56$f$; and a third leg portion 121$c$ extending toward the working gear 82. A bulging portion 122 is formed in a free end portion of the first leg portion 121$a$ of the swingable member 121, and abuts on a pin 119$'r$ fixedly mounted on a free end portion of the rotary lever 119$r$ when the rear reel gear 56$r$ is rotatably driven. On the other hand, an engaging shoulder portion 124 is formed in a free end portion of the second leg portion 121$b$ of the swingable member 121, and abuts on a pin 119$'f$ fixedly mounted on a free end portion of the rotary lever 119$f$ when the front reel gear 56$f$ is rotatably driven. Further, as shown in FIG. 22, a bent working portion 126 is formed in a free end portion of the third leg portion 121$c$ of the swingable member 121, and abuts on the working portion 80 of the long leg portion 77$b$ of the second rod 77 of the channel selector mechanism 60 in operation. A pin 125 is fixedly mounted on the third leg portion 121$c$ of the swingable member 121 at a position adjacent to the working portion 126 so as to be oppositely disposed from a concave cam portion 127 which is integrally formed with the working gear 82 as shown in FIG. 22. The concave cam portion 127 is constructed of: a small-diameter cam surface 127$a$ and a large-diameter cam surface 127$b$. The reference numeral 128 denotes a projected portion of the working gear 82. The projected portion 128 extends inside the concave cam portion 127 of the working gear 82 so as to cooperate with the pin 125 of the third leg portion 121$c$ of the swingable member 121 in operation. On the other hand, the reference numerals 129$f$ and 129$r$ denote a front stopper and a rear stopper formed in the reel gears 56$f$ and 56$r$, respectively. These stoppers 129$f$ and 129$r$ abut on the pins 119$f$ and 119$r$ of the rotary levers 119$f$ and 119$r$ respectively to rotatably drive the rotary levers 119$f$ and 119$r$ respectively when the reel gears 56$f$ and 56$r$ rotate.

In a condition shown in FIG. 22 in which the rear reel gear 56$r$ rotates as shown in FIGS. 8 and 22 to wind the tape of the cassette tape C loaded in the player on the reel wheel of the cassette tape C engaging with the rear reel shaft 55$r$ shown in FIG. 8, since the reel gear 56$r$ rotates clockwise, the rotary lever 119$r$ which frictionally engages with the reel gear 56$r$ through the real base 120$r$ also rotates clockwise together with the reel gear 56$r$ so that the pin 119$'r$ of the rotary lever 119 abuts on the bulging portion 122 of the first leg portion 121$a$ of the swingable member 121 to rotate the member 121 clockwise. As a result, the pin 125 of the third leg portion 121$c$ of the swingable member 121 abuts on the concave cam portion 127 of the reel gear 56$r$ as shown in FIG. 22.

On the other hand, since the working gear 82 is constantly rotatably driven by means of the constantly rotated front flywheel 53$f$ through the drive gear 54$f$ and the intermediate gear 83, the swingable member 121 is oscillated between the small-diameter cam surface 127$a$ and the large-diameter cam surface 127$b$ of the concave cam portion 127 of the working gear 82.

As described above, in a condition in which the swingable member 121 is oscillated under the influence of a torque applied by the rotary lever 119$r$ and a pushing force applied by the concave cam portion 127 of the working gear 82 through the pin 125 of the third leg portion 121$c$ of the swingable member 121, when the tape of the cassette tape C loaded in the player reaches its end, the rotational movement of the reel base 120$r$ stops to cease the torque applied to the swingable member 121.

Figure 23:
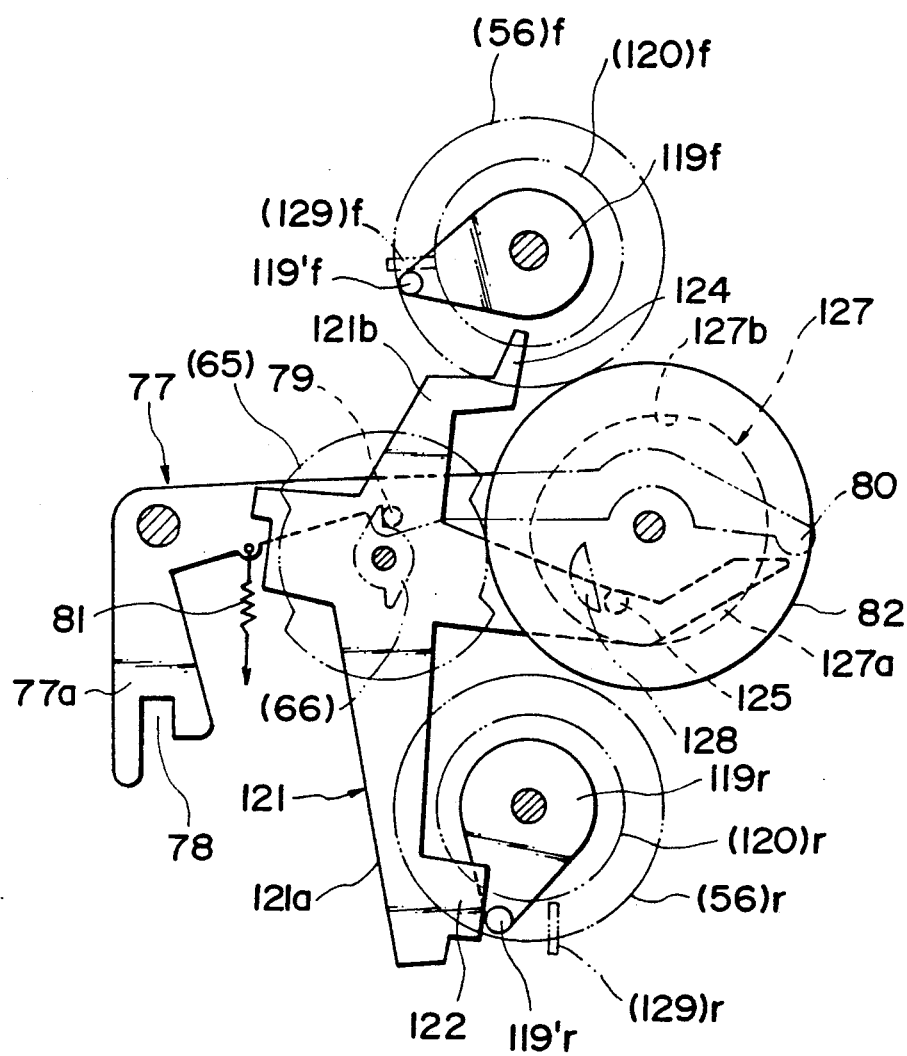

Under such circumstances, as shown in FIG. 22, the working gear 82 keeps on rotating so that the pin 125 of the swingable member 121 follows the large-diameter cam surface 127$b$ of the concave cam portion 127 of the working gear 82 to move radially inwardly. As a result, as shown in FIG. 23, the pin 125 of the swingable member 121 eventually engages with the projected portion 128 of the working gear 82 so that the pin 125 of the swingable member 121 is forcibly moved further radially inwardly by the projected portion 128 of the working gear 82.

Figure 24:
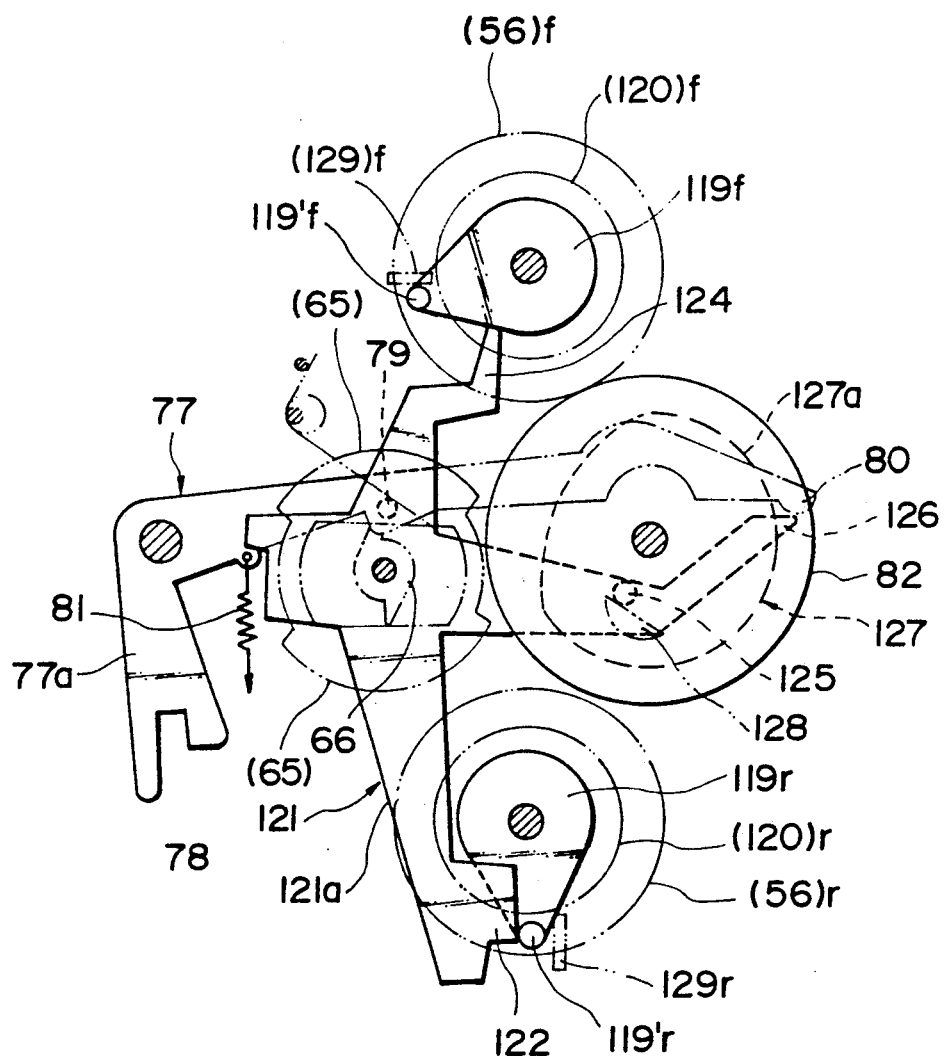
Figure 25:
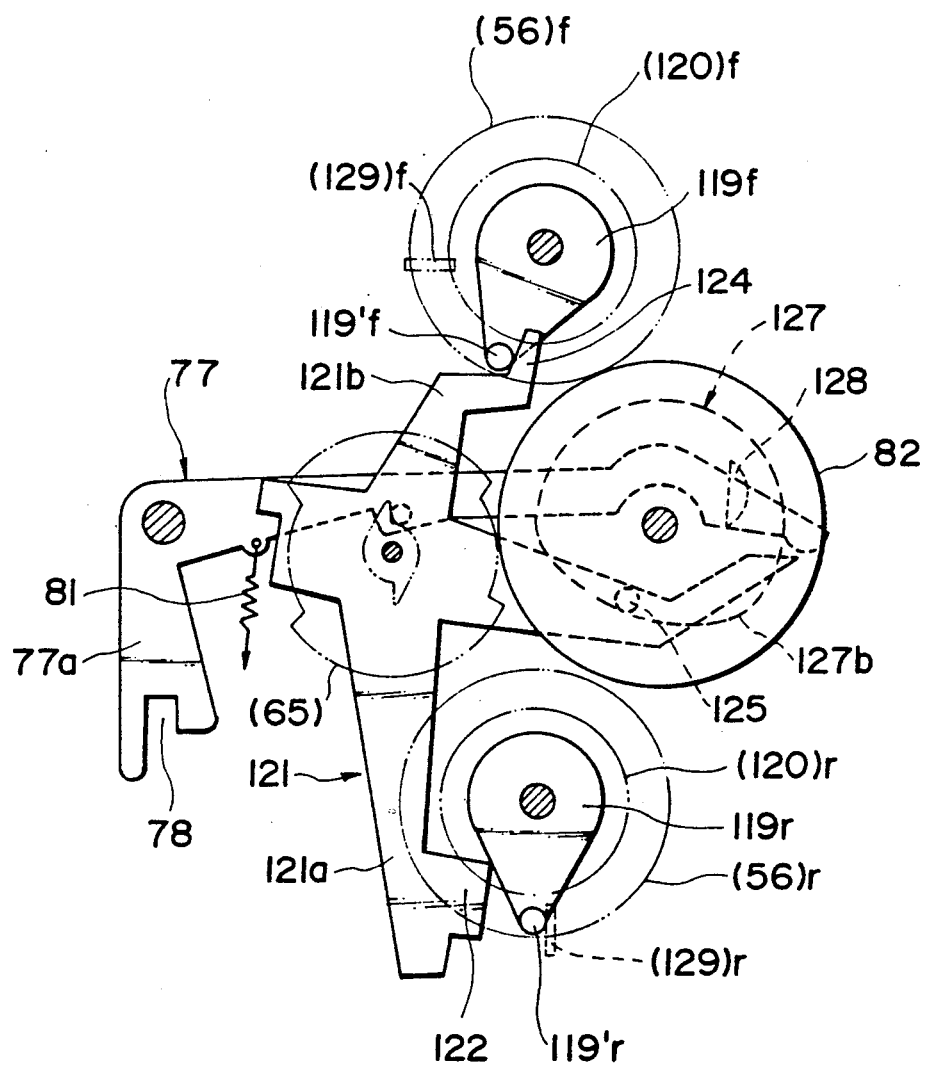

As a result, as shown in FIG. 24, a front end of the working portion 126 of the swingable member 121 abuts on the oblique abutting portion 80 of the second rod 77 of the channel selector mechanism 60 to urge the abutting portion 80 of the second rod 77 so that the second rod 77 is rotated counterclockwise against the resilient force exerted by the spring 81, whereby the engaging pin 79 of the long leg portion 77$b$ of the second rod 77 is released from the pawl portion of the pawl element 66 of the intermittent gear 65 to permit the gear 65 to rotate as shown in FIG. 24. As a result, as already described with respect to the channel selector mechanism 60, the channel selector member 47 shown in FIG. 8 is moved as is in the case that the rewinding lever 3 is pushed or moved forward, so that the tape of the cassette tape C loaded in the player changes its traveling direction. At this time, as shown in FIG. 25, the reel bases 120$f$ and 120$r$ rotate counterclockwise, respectively. Under such circumstances, the pin 119$'r$ of the rear rotary lever 119$r$ abuts on the stopper 129$r$ of the reel gear 56$r$, while the pin 119$'f$ of the front rotary lever 119$f$ engages with the engaging shoulder portion 124 of the second leg portion 121$b$ of the swingable member 121 so that the pin 125 of the swingable member 121 follows again the concave cam portion 127 of the working gear 82 as shown in FIG. 25.

In a condition shown in FIG. 25, when the tape of the cassette tape C reaches its end in operation, the torque applied to the rotary lever 119f ceases to release the pin 125 of the swingable member 121 from the concave cam portion 127 of the working gear 82.

Incidentally, in the above embodiment of the present invention, the third portions 91 and 91' of the quick traverse lever 2 and the rewinding lever 3 extend in a direction substantially parallel to the longitudinal direction of the chassis 1, respectively. However, the third portions 91 and 91' of these levers 2 and 3 may assume other suitable forms as described below. Namely, for example, in a condition shown in FIGS. 20 and 26 in which the quick traverse lever 2 is held in its forward position while the rewinding lever 3 stays in its rearward position or inoperative position so that the working segment portion 116 of the swingable lever 112 abuts on the first portion 89' of the rewinding lever 3, when the rewinding lever 3 is moved forward, the working segment portion 116 of the swingable lever 112 separates from the first portion 89' of the rewinding lever 3 as shown in FIG. 27 to abut on the third portion 91 of the quick traverse lever 2 held in its forward position. After that, as the rewinding lever 3 is further moved forward, the second portion 90' of the rewinding lever 3 passes through the working segment portion 116 of the swingable lever 112 so that the engaging projection 3e of the rewinding lever 3 abuts on the lower end of the engaging member 101 as shown in FIG. 19 to rotate the engaging member 101 clockwise, whereby the engaging projection 2e of the quick traverse lever 2 is released from the engaging hole 102 of the engaging member 101 to permit the quick traverse lever 2 to return to its rearward position or inoperative position under the influence of the resilient force exerted by the return spring 5. As a result, the working segment portion 116 of the swingable lever 112 abuts on the first portion 89 of the quick traverse lever 2 as shown in FIG. 28.

Figure 26:
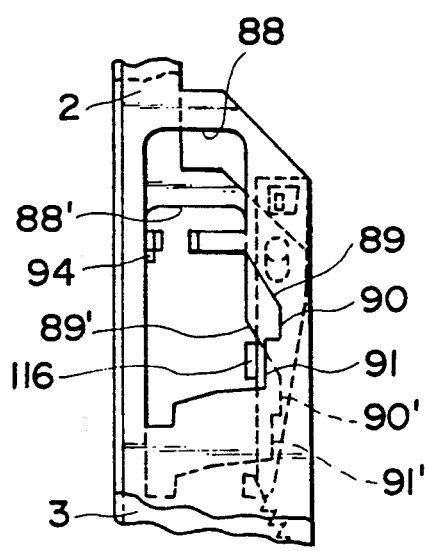
FIGS. 26 to 28 are a series of the partial plan views of the player of FIG. 1, illustrating the relationship between the quick traverse lever/the rewinding lever and the actuating mechanism of the player of FIG. 1.

However, in the above operation, in case that the rewinding lever 3 inclines rightward or leftward in FIG. 26 during its forward movement, there is a fear that the third portion 91' of the rewinding lever 3 engages with the working segment portion 116 of the swingable lever 112 to prevent the rewinding lever 3 from smoothly moving forward.

Figure 28:
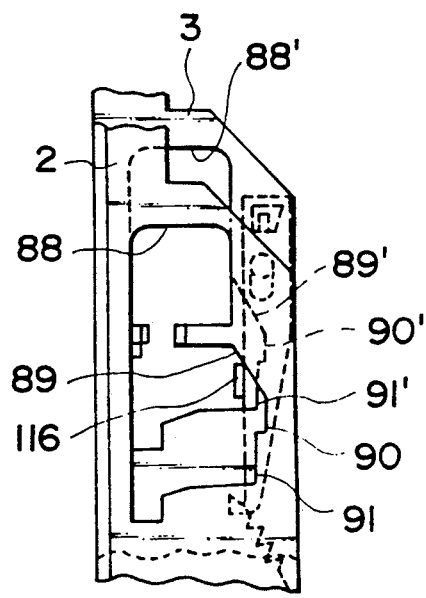

On the other hand, in a condition shown in FIG. 28 in which the rewinding lever 3 has been held in its forward position, when the quick lever 2 is moved forward, a fear similar to the above fear occurs.

In order to eliminate such fear, as shown in FIGS. 29 and 30, the third portions 91 and 91' of the levers 2 and 3 are replaced with modified third portions 91" and 91"', respectively. The modified third portions 91" and 91"' constitute oblique portions respectively to urge the working segment portion 116 of the swingable lever 112 leftward against the resilient force exerted by the spring 111 shown in FIG. 17 when the levers 2 and 3 are moved forward.

Figure 31:
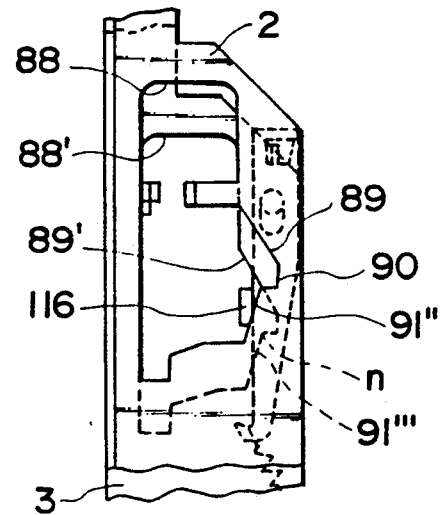
FIG. 31 is a partial plan view of the player of FIG. 1, illustrating the relationship between the modified quick traverse lever/modified rewinding lever and the actuating mechanism of the player.

In the embodiment of the present invention employing such modified third portions 91" and 91"' of the levers 2 and 3, for example, when the rewinding lever 3 is moved forward in a condition in which the quick traverse lever 2 has been held in its forward position, as shown in FIG. 13, the working segment portion 116 of the swingable lever 112 abuts on the modified third portion 91" of the quick traverse lever 2 immediately after the working segment portion 116 separates from the first portion 89 of the rewinding lever 3. In this case, since the working segment portion 116 of the swingable lever 112 abuts on the modified third portion 91" of the quick traverse lever at a position further leftward than that of an upper portion "n" of the modified third portion 91"' of the rewinding lever 3 as is clear from FIG. 31, it is possible for the second portion 90' of the rewinding lever 3 to smoothly pass through the working segment portion 116 of the swingable lever 112 without interfering with the working segment portion 116, so that the rewinding lever 3 realizes its smooth forward and rearward movement in a reciprocating manner in the longitudinal direction of the chassis 1.

In the above description, although not shown in the drawings, it is also possible to reduce an inclination angle of the modified third portion 91"' of the rewinding lever 3 so that a rearward end of the modified third portion 91"' is positioned at a point further leftward. In this case, when the quick traverse lever 2 is moved forward into its forward position, the modified third portion 91" of the lever 2 forcibly rotates the working segment portion 116 of the swingable lever 112 clockwise against the resilient force exerted by the spring 111 shown in FIG. 17 to separate the working segment portion 116 from the first portion 89' of the rewinding lever 3, so that the working segment portion 116 of the swingable lever 112 is positioned at a point further leftward than that of the upper end "n" of the modified third portion 91"' of the rewinding lever 3. As result, the second portion 90' of the rewinding lever 3 smoothly passes through the working segment portion 116 of the swingable lever 112 without interfering therewith. A similar action to the above is realized when the quick traverse lever 2 is moved forward in a condition in which the rewinding lever 3 has been held in its forward position.

Now, a music-interval detecting mechanism 130 will be hereinbelow described in detail.

Figure 32:
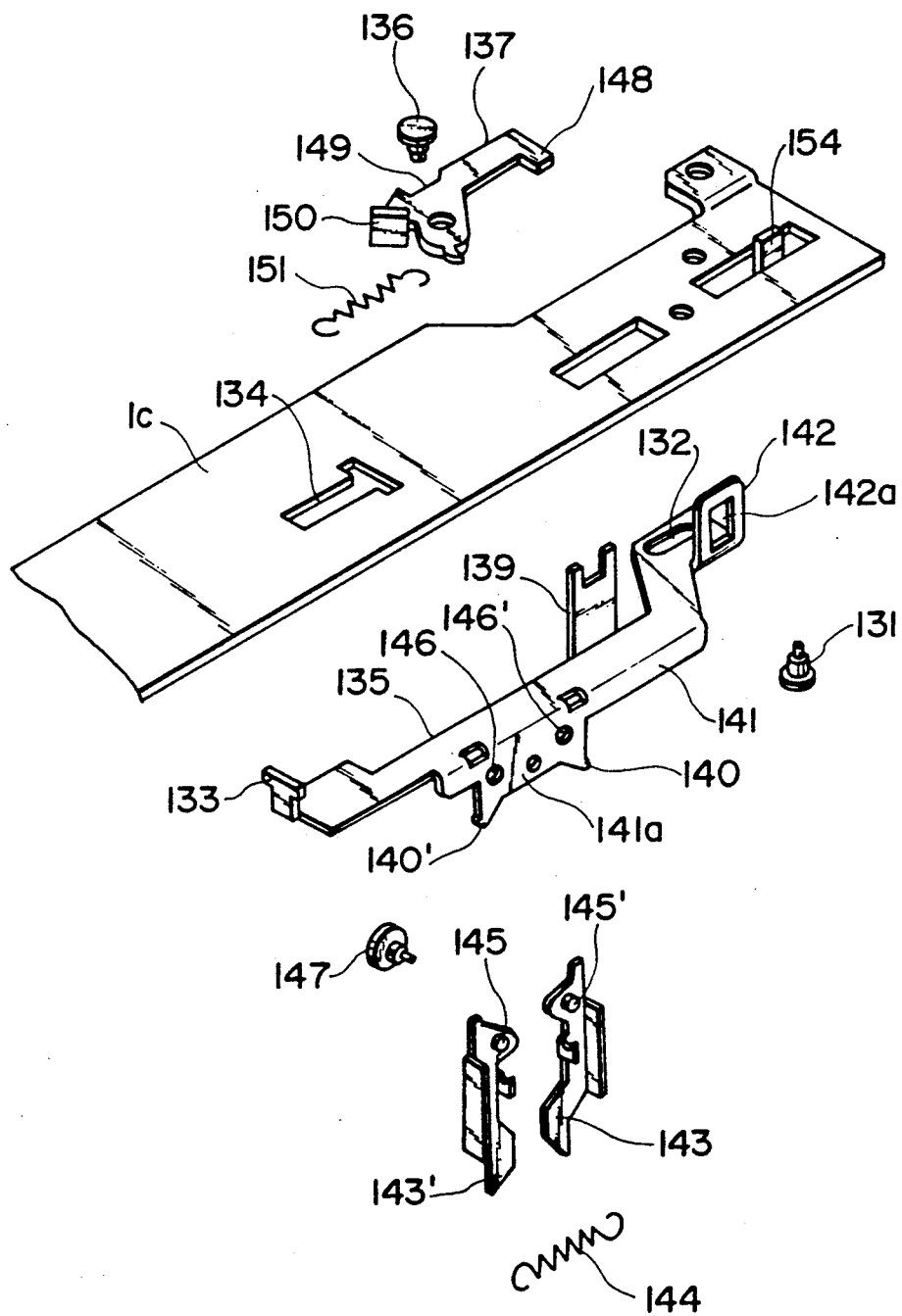
FIG. 32 is a perspective exploded view of the music-interval detecting mechanism of the player of FIG. 1.
Figure 33:
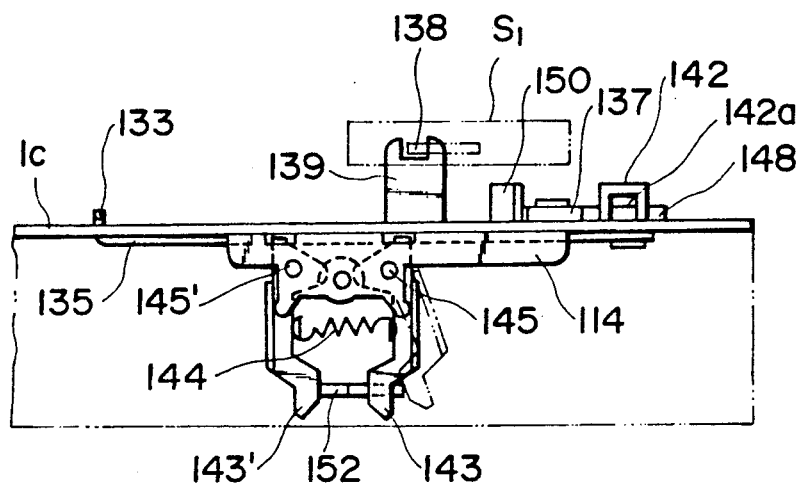
FIGS. 33 and 34 are a series of plan views of the music-interval detecting mechanism shown in FIG. 32, illustrating the operation thereof.

As shown in FIG. 32, the music-interval detecting mechanism 130 is constructed of : elongated interlocking member 135 which is disposed under the sub-chassis 1c on which the quick traverse lever 2 and the rewinding lever 3 are mounted to be movable forward and rearward, the interlocking member 135 being provided witn an elongated hole 132 in its forward end portion and an upright tab portion 133 in its rearward end portion, in which elongated hole 132 is received a pin 131 which is fixed to the sub-chassis 1c as shown in FIG. 33 to support and permit the interlocking member 135 to be movable forward and rearward, the upright tab portion 133 of the interlocking member 135 being mounted in an elongated hole 134 of the sub-chassis 1c so as to be movable forward and rearward; and a blocking member 137 rotatably mounted on an upper surface of a forward end portion of the sub-chassis 1c through a pivot 136 fixed to the sub-chassis 1c. As shown in FIG. 32, the interlocking member 135 is provided with: a control tab portion 139 in an intermediate portion of the member 135, which control tab portion 139 extends upward in a direction perpendicular to the plane in which the chassis 1 lies, the control tab portion 139 being engaged with a lateral tab portion 138 of a switch $S_1$ employed in a channel selector circuit of the magnetic head 27 as shown in FIG. 33; a rib portion 141 in a rightward end portion of the member 135, which rib portion 141 extends downward in a direction perendicular to the plane in which the chassis 1 lies, a substantially rearward part of the rib portion 141 extending further downward than the remaining part to form a mounting portion 141a a forward end and a rearward end of a lower end portion of which mounting portion 141a are formed into a forward convex portion 140 and a rearward convex portion 140'; and a gate-like upright engaging portion 142 in a forward portion of the member 135, which engaging portion 142 extends upward in a direction perpendicular to the plane in which the chassis 1 lies. As in clear from FIG. 33, upper projected portions 145 and 145' of a pair of L-shaped leg segments 143 and 143' are rotatably mounted in a pair of holes 146 and 146' of the mounting portion 141a of the interlocking member 135, respectively. A spring 144 is interposed between intermediate portions of the L-shaped leg segments 143 and 143' which are oppositely disposed from each other in assembling to urge the leg segment 143 clockwise and the leg segment 143' counterclockwise as viewd in FIG. 33. The reference numeral 147 shown in FIG. 32 denotes a holding piece for rotatably holding the projected portions 145 and 145' of the l-shaped leg segments 143 and 143' in the holes 146 and 146' of the interlocking member 135, respectively. Consequently, the leg segments 143 and 143' are swingable in a plane perpendicular to the plane in which the chassis 1 lies. Swinging strokes of the leg segments 143 and 143' are restricted by the convex portions 140 and 140' of the interlocking member 135 respectively, because each of the convex portions 140 and 140' abuts on a rightward tab portion of each of the leg segments 143 and 143' in swinging movement of each of the leg segments 143 and 143', which rightward tab portion extends rightward in FIG. 32 from a vertical edge portion of each of the leg segments 143 and 143'.

On the other hand, as shown in FIG. 32, the blocking member 137 is provided with: a pawl portion 148 in a forward end portion of the member 137, which pawl portion 148 engages with the engaging portion 142 of the interlocking member 135 in operation; a concave shoulder portion 149 in a leftward area of an intermediate portion of the member 137, which shoulder portion 149 engages with the pin 95 of the rewinding lever 3 shown in FIG. 16 in operation; and an abutting portion 150 in a rearward end portion of the member 137, which abutting portion 150 extends upward in a direction perpendicular to the plane in which the chassis 1 lies. As shown in FIG. 21, a spring 151 is interposed between the blocking member 137 and the sub-chassis 1 to constantly urge the blocking member 137 clockwise so that the pawl portion 148 of the blocking member 137 abuts on the engaging portion 142 of the interlocking member 135 in operation.

On the other hand, in FIGS. 17 and 18: the reference character S₂ denotes a muting switch which is operated by the first concave portions 2d and 3d of the quick traverse lever 2 and the rewinding lever 3 when these levers 2 and 3 are moved forward; and the reference character S₃ denotes a switch for doubling a rotational speed of an electric motor of the player, which switch is operated by the second concave portions 2g and 3g of the quick traverse lever 2 and the rewinding lever 3 when these levers 2 and 3 are moved forward. These switches S₂ and S₃ stay in their ON-positions so long as the levers 2 and 3 stay in their forward positions.

FIG. 1: the reference numeral 153 denotes a mounting bracket for fixedly mountiung the switches S₁, S₂ and S₃ on the chassis 1, the mounting bracket 153 being fixedly mounted on a rightward end portion of the chassis 1; the reference numeral 154 denotes a blocking tab portion of the chassis 1 for restricting the rotational movement of the blocking member 137 in stroke.

In a condition shown in FIGS. 5 and 17 in which the tape of the cassette tape C travels in its forward direction, when the rewinding lever 3 is moved forward against the resilient force exerted by the return spring 6 shown in FIG. 1, the pin 95 of the forward end portion of the rewinding lever 3 is separated from the concave shoulder portion 149 of the blocking member 137 to permit the member 137 to rotate clockwise under the influence of the resilient force exerted by the spring 151 as shown in FIGS. 18 and 19, whereby the pawl portion 148 of the blocking member 137 abuts on a forward edge of the gate-like upright engaging portion 142 of the interlocking member 135 to prevent the interlocking member 135 from moving froward in the longitudinal direction of the chassis 1 as viewed in FIG. 18. Then, the rewinding lever 3 is moved further forward so as to be held in its forward position by the engaging member 101 as shown in FIG. 18.

Also, as already described, such forward movement of the rewinding lever 3 causes the head plate 28 to move rightward in FIG. 18 so that a quick traverse operation of the tape of the cassette tape C loaded in the player is conducted. At this time, in FIG. 8, the channel selector member 47 moves rearward in the longitudinal direction of the chassis 1 to cause the channel selector mechanism 60 to realize a change in traveling direction of the tape of the cassette tape C.

On the other hand, when the channel selector member 47 moves rearward in FIG. 8, as shown in FIG. 13, the front rotary plate 48f rotates counterclockwise. Consequently, an interlocking portion 152 of the front rotary plate 48f is moved forward, which interlocking portion 152 forms a rightward extension of the rotary plate 48f as shown in FIG. 13. As a result of such forward movement of the interlocking portion 152 having been sandwich between the forward leg segment 143 and the rearward leg segment 143' as shown in FIG, 33, the forward leg segment 143 is rotated counterclockwise so that a lower free end portion of the forward leg segment 143 is moved forward against the resilient force exerted by the spring 144 as shown in phantom lines in FIG. 33. Namely, in a condition shown in FIG. 21, since the engaging portion 142 of the interlocking member 135 is prevented from moving forward by the blocking member 137, when the rewinding lever 3 is moved forward, only the rotary plate 48f is rotated to realize only a change in traveling direction of the tape of the cassette tape C without operating the switch S₁ employed in the channel selector circuit. Consequently, in a condition in which the head plate 28 stays in its rightward position or inoperative position shown in FIG. 10, the tape of the cassette tape C loaded in the player is brought into a slight contact with the magnetic head 27 to permit the music-interval detecting mechanism 130 (shown in FIG. 32) to achieve its function during the rewinding operation of the tape by use of the same track of the magnetic head 27.

As a result, the music-interval detecting mechanism 130 issues a detection signal which causes a solenoid R as shown in FIG. 1 to retract its iron rod rearward in the longitudinal direction of the chassis 1 so as t rotate the engaging member 101 clockwise against the resilient force exerted by the return spring 103, so that the rewinding lever 3 having been held in its forward position is permitted to automatically return to its rearward position under the influence of the resilient force exerted by the return spring shown in FIG. 1.

When the rewinding lever 3 returns to its rearward position in the longitudinal direction of the chassis 1, as shown in FIG. 21, the pin 95 of the forward end portion of the rewinding lever 3 abuts on the concave shoulder portion 149 of the blocking member 137 to rotate the member 137 counterclockwise against the resilient force exerted by the spring 151 as shown in FIG. 17. Consequently, the engaging portion 142 of the interlocking member 135 is released from the pawl portion 148 of the blocking member 137 to permit the interlocking member 135 to move forward. As a result, the interlocking member 135 moves forward from a position shown in FIG. 33 to a position shown in FIG. 34 under the influence of the resilient force exerted by the spring 144, since the lower free end portion of the forward leg segment 143 having abutted on a forward end of the interlocking portion 152 of the rotary plate 48f in a condition shown in FIG. 33 in phantom lines pushes the interlocking portion 152 of the rotary plate 48f rearward under the influence of the resilient force exerted by the spring 144 so as to urge the interlocking member 135 forward relative to the interlocking portion 152 of the rotary plate 48f. At this time, the switch $S_1$ employed in the channel selector circuit is operated. However, as already described in the above, at this time, a change in traveling direction of the tape of the cassette tape C is also accomplished during the rearward movement of the rewinding lever 3, and the rotary plate 48f is rotated clockwise by the channel selector mechanism 60 so as to return to its initial position shown in FIGS. 8 and 11 from a position shown in FIG. 13. Therefore, the interlocking portion of the rotary plate 48f moves rearward from a position shown in FIG. 34 to a position shown in FIG. 33 so that the switch $S_1$ and the interlocking member 135 return to their initial positions shown in FIG. 33 in solid lines.

Figure 34:
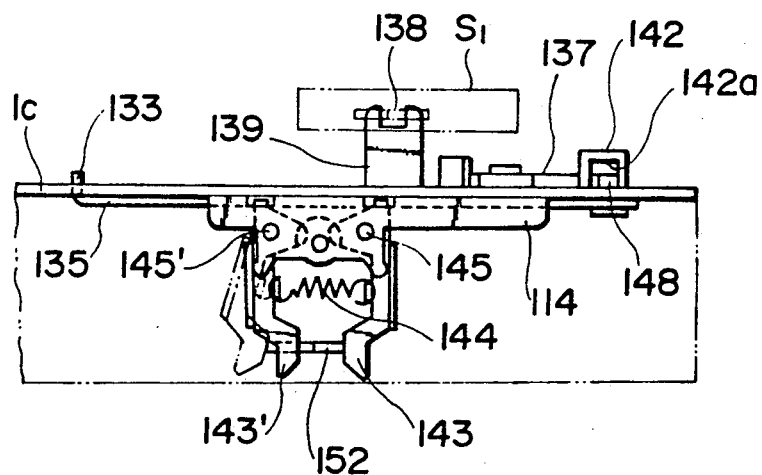

Namely, operation moving the members of the tape player from a condition shown in FIG. 33 in phantom lines to a condition shown in FIG. 34 in solid lines is conducted simultaneously with operation moving such members from the condition shown in FIG. 34 in solid lines to the condition shown in FIG. 33 in phantom lines. As a result, in this case, substantially, the switch $S_1$ is not operated.

On the other hand, in a condition shown in FIG. 13 in which the tape of the cassette tape C loaded in the player travels to be rewound on the reel wheel of the cassette tape C, when the rewinding lever 3 is moved forward against the resilient force exerted by the return spring 6, the pin 95 of the forward end portion of the rewinding lever 3 is separated from the blocking member 137 as shown in FIG. 18 to permit the blocking member 137 to rotate clockwise as shown in FIGS. 17 and 17 as already described above. In a condition shown in FIG. 13, the rotary plate 48f has been rotated counterclockwise so that the locking member 135 has been moved forward together with the locking portion 152 of the rotary plate 48f. Consequently, under such circumstances, when the blocking member 137 rotates clockwise as described above, the pawl portion 148 of the blocking member 137 enters a hole 142a of the engaging portion 142 of the interlocking member 135 as shown in FIG. 34 in solid lines to prevent the interlocking member 135 to move rearward in the longitudinal direction of the chassis 1. On the other hand, as already described above, the rewinding lever 3 is held in its forward position by the engaging member 101 as shown in FIG. 18. Under such circumstances, the head plate 28 is moved rightward in FIG. 18 to permit the tape of the cassette tape C to quickly travels. At the same time, a change in traveling direction of the tape is accomplished when the channel selector member 47 moves forward in the longitudinal direction of the chassis 1. When the channel selector member 47 moves forward, the front rotary plate 48f is rotated clockwise as shown in FIGS. 8 and 13 to move its locking portion 152 rearward, the locking portion 152 of the front rotary plate 48f being sandwiched between the leg segments 143 and 143' as shown in FIGS. 33 and 34. In this case, since the locking member 135 is prevented from moving rearward, a lower free end portion of the rearward, leg segment 143' is moved rearward by the locking portion 152 of the front rotary plate 48f against the resilient force exerted by the spring 144 so that the rear leg segment 143' rotates clockwise as shown in FIG. 34 in phantom lines. Namely, when the rewinding lever 3 is moved forward in a condition in which the interlocking member 135 is prevented from moving rearward by the blocking member 137, only the front rotary plate 48f is rotated to realize only a change in traveling direction of the tape of the cassette tape C without operating the switch $S_1$ employed in the channel selector circuit. Under such circumstances, the music-interval detecting operation is conducted.

After completion of such music-interval detecting operation, the music-interval detecting mechanism 136 shown in FIGS. 33 and 34 issues a detection signal which actuates the solenoid R shown in FIG. 8 to cause its iron rod to retract. Since the thus retracted iron rod of the solenoid R is connected with a right end of the lateral leg portion 101a of the engaging member 101, the member 101 is rotated clockwise against the resilient force exerted by the spring 103 to automatically release the rewinding lever 3 from its forward position as described above.

When the rewinding lever 3 returns to its rearward position, the pin 95 in the forward end portion of the rewinding lever 3 abuts on the concave shoulder portion 149 of the blocking member 137 as shown in FIG. 17 to rotate the blocking member 137 counterclockwise against the resilient force exerted by the spring 151. Consequently, the engaging portion 142 of the interlocking member 135 is released from the pawl portion 148 of the blocking member 137 as shown in FIG. 17 to permit the interlocking member 135 to move rearward in the longitudinal direction of the chassis 1. As a result, the interlocking member 135 is moved rearward toward a position shown in FIG. 33 in solid lines in the longitudinal direction of the chassis 1 under the influence of the resilient force exerted by the spring 144 in a condition in which the rearward leg segment 143' abuts on the interlocking portion 152 of the front rotary plate 48f. In this case, however, as already described above, a traveling direction of the tape of the cassette tape C is changed again during the rearward movement of the rewinding lever 3 so that the front rotary plate 48f is rotated counterclockwise by the channel selector mechanism 60, whereby the interlocking member 135 is moved forward in the longitudinal direction of the chassis 2 in a condition in which the interlocking portion 152 of the front rotary plate 48f is sandwiched between the leg segments 143 and 143' of the interlocking member 135. As a result, the interlocking member 135 and the switch $S_1$ return to their initial positions shown in FIG. 34 in solid lines.

Namely, operation moving the members of the tape player from a condition shown in FIG. 34 in phantom lines to a condition shown in FIG. 33 in solid lines is conducted simultaneously with operation moving such members from the condition shown in FIG. 33 in solid lines to the condition shown in FIG. 34 in phantom lines. As a result, in this case, substantially, the switch $S_1$ is not operated.

On the other hand, in a condition shown in FIG. 8, in order to realize a change in traveling direction of the tape of the cassette tape C loaded in the player, when the quick traverse lever 2 is moved forward simultaneously with the rewinding lever 3, as already described above, the actuating mechanismm 107 shown in FIG. 5 realizes a change in traveling direction of the tape of the cassette tape C. In this case, the levers 2 and 3 are movable forward and rearward in the longitudinal direction of the chassis 1 within restricted strokes without being held in their forward positions.

Under such circumstances, as shown in FIG. 21, the interlockimg member 135 is prevented from moving forward since the engaging portion 142 of the interlocking member 135 abuts on the pawl portion 148 of the blocking member 137. On the other hand, at this time, as shown in FIG. 33 in phantom lines, the interlocking portion 152 of the front rotary plate 48f rotates only the forward leg segment 143 counterclockwise against the resilient force exerted by the spring 144 without operating the switch $S_1$. Consequently, under such circumstances, when the user releases the levers 2 and 3 from his pushing action, the levers 2 and 3 return to their rearward positions under the influence of the resilient force exerted by the return springs 5 and 6, respectively. As a result, the pin 95 of the forward end portion of the rewinding lever 3 abuts on the concave shoulder portion 149 of the blocking member 137 to rotate the member 137 counterclockwise against the resilient force exerted by the spring 151 so that the engaging portion 142 of the interlocking member 135 is released from the pawl portion 148 of the blocking member 137 to permit the interlocking member 135 to move forward in the longitudinal direction of the chassis 1, whereby the interlocking member 135 moves forward to a position shown in FIG. 34 in solid lines under the influence of the resilient force exerted by the spring 144 in a condition shown in FIG. 33 in which the forward leg segment 143 of the interlocking member 135 abuts on the interlocking portion 152 of the front rotary plate 48f. At this time, the switch $S_1$ is operated. Incidentally, at this time, the forward movement of the rewinding lever 3 is restricted in stroke to make it impossible to operate the channel selector mechanism 60 during the forward movement of the rewinding lever 3.

As a result of the above operation, the tape of the cassette tape C loaded in the player is sound-reproduced in its B side at a constant traveling speed during reverse traveling operation of the cassette tape C.

Further, in a condition shown in FIG. 13, in order to realize a change in traveling direction of the tape of the cassette tape C loaded in the player, when the quick traverse lever 2 is moved forward simultaneoulsy with the rewinding lever 3, the actuating mechanism 107 shown in FIG. 9 realizes a change in traveling direction of the tape as is in the above case. In this case, the levers 2 and 3 are restricted in stroke of their forward movements without being held in their forward positions.

Under such circumstances, as already described above, the pawl portion 148 of the blocking member 137 enters the hole 142a of the engaging portion 142 of the interlocking member 135 to prevent the member 135 from moving rearward in the longitudinal direction of the chassis 1. At this time, as shown in FIG. 34 in phantom lines, the interlocking portion 152 of the front rotary plate 48f rotates the rearward leg segment 143' of the interlocking member 135 clockwise against the resilient force exerted by the spring 144 without operating the switch $S_1$. In this condition, when the user releases the levers 2 and 3 from his pushing action, the levers 2 and 3 returns to their rearward positions under the influence of the resilient forces exerted by the return springs 5 and 6, respectively. As a result, the pin 95 of the forward end portion of the rewinding lever 3 abuts on the concave shoulder portion 149 of the blocking member 137 to rotate the member 137 couterclockwise against the resilient force exerted by the spring 151, so that the engaging portion 142 of the interlocking member 135 is released from the pawl portion 18 of the blocking member 137 to permit the interlocking member to move rearward in the longitudinal direction of the chassis 1. Consequently, the interlocking member 135 move rearward to a position shown in FIG. 33 in phantom lines under the influence of the resilient force exerted by the spring 144 in a condition shown in FIG. 34 in which the interlocking portion 152 of the front rotary plate 48f abuts on the rearward leg segment 143' of the interlocking member 135. At this time, the switch $S_1$ is operated.

During the forward and rearward movements of the rewinding lever 3, the channel selector mechanism 60 is not operated as already describe. As a result of teh above operation, the tape of the cassette tape C loaded in the player is sound-reproduced in its A side at a constant traveling speed during the forward traveling operation of the tape.

Incidentally, in case that it is required to conduct the music-interval detecting operation during the forward traveling operation of the tape of the cassette tape C loaded in the player, the quick traverse lever 2 is moved forward against the resilient force exerted by the return spring 5.

In this case, as already described, only the head plate 28 is moved rightward to its inoperative position in a direction perpendicular to the longitudinal direction of the chassis 1 without operating the switch $S_1$ employed in the channel selector circuit and without conducting changing operation of the traveling direction of the tape of the cassette tape C loaded in the player.

On the other hand, in the above operation, in case that the quick traverse lever 2 is moved forward simultaneously with the rewinding lever 3, on rare occasions, the quick traverse lever 2 advances slightly in front of the rewinding lever 3 as shown in FIG. 26. In a condition shown in FIG. 26 in which the first portion 89' of the rewinding lever 3 still abuts on the working segment portion 116 of the swingable lever 112 while the second portion 90 of the quick traverse lever 2 has already passed through the working segment portion 116 of the swingable lever 112, in spite of simultaneous forward movements of the levers 2 and 3, the working segment 116 of the swingable lever 112 does not engage with the second portions 90 and 90' of the levers 2 and 3 to permit the levers 2 and 3 to be released from restrictions applied to their forward movements in stroke. As a result, it is possible for the levers 2 and 3 to move further forward so as to be held in their forward positions by the engaging member 101. However, when the levers 2 and 3 are thus held in their forward positions simultaneously with each other, it is impossible for the user of the player to release one of the levers 2 and 3, which one is held in its forward position, from such forward position by the use of the other of the levers 2 and 3, which the other is still not held in its forward position.

Consequently, in the embodiment of the present invention, the abutting portion 150 is formed in the blocking member 137 to resolve the above problem.

Namely, in the embodiment of the present invention employing the blocking member 137 provided with the abutting portion 150, when the quick traverse lever 2 is moved forward simultaneously with the rewinding lever 3, in spite of whether or not the quick traverse lever 2 advances in front of the rewinding lever 3 during their forward movements, in the beginning of the forward movement of the rewinding lever 3, the pin 95 of the forward end portion of the rewinding lever 3 separates from the concave shoulder portion 149 of the blocking member 137 to permit the member 137 to immediately rotate clockwise as shown in FIG. 21 under the influence of the resilient force exerted by the spring 151. Consequently, as shown in FIG. 21, the bulging portion 2j of the quick traverse lever 2 abuts on the abutting portion 150 of the blocking member 137 to prevent the quick traverse lever 2 from further moving forward. At this time, in contrast with the quick traverse lever 2, the rewinding lever 3 is permitted to move further forward so as to be held in its forward position by the engaging member 101. As a result, in case that the rewinding lever 3 is thus held in its forward position, it is possible for the user of the player to release the rewinding lever 3 from its forward position by pushing or moving the quick traverse lever 2 forward to rotate the engaging member 101 clockwise as shown in FIG. 21, whereby a fear that the quick traverse lever 2 is held in its forward position simultaneously with the rewinding lever 3 is eliminited.

EFFECT OF THE INVENTION

The present invention has the above construction. Consequently, for example, is case that it is required to rewind the tape of the cassette tape C loaded in the player, even when the rewinding lever 3 is moved forward after the quick traverse lever 2 has been moved forward by mistake and therefore has been held in its forward position by mistake, it is possible to release the quick traverse lever 2 from its forward through the forward movement of the rewinding lever 3 without interfering the rewinding operation of the tape of the cassette tape C. As a result, the cassette tape player of the present invention having the above construction is excellent in easiness in use. In addition, in case that only the traveling direction of the tape of the cassette tape C loaded in the player of the present invention is changed during the sound-reproducing operation of the tape, there is no fear that the noise caused by the quick traverse operation of the tape is produced, because the quick traverse operation of the tape is not conducted in the player of the present invention in this case.

Further, according to the present invention, the swingable lever 112 of the actuating mechanism 107 shown in FIG. 9 is rotatably biased counterclockwise by the spring 111 so that the working portion 116 of the swingable lever 112 abuts on any of the first portions 89 and 89′, second portions 90 and 90′ and the third portions 91 and 91′ of the levers 2 and 3 to reduce a necessary space in which the actuation mechanism 107 is disposed without being interfered inpositionand in design. In addition, the actuating mechanism 107 is also advantageous in size-reduction. As described above, the cassette tape player of the present invention employs the quick traverse lever 2 and the rewinding lever 3 both of which levers 2 and 3 are provided with the working windows 88 and 88′, respectively. Since the first portions 89 and 89′, second portions 90 and 90′ and the third portions 91 and 91′ are sequentially formed in rightward edge portions of the working windows 88 and 88′ of the levers 2 and 3, respectively. Consequently, it is easy to form these portions in the lever 2 and 3, respectively. In case that the modified third protions 91″ and 91‴ are employed in the levers 2 and 3, the levers 2 and 3 can move smoothly forward without interfering with the working segment portion 116 of the swingable lever 112 since the modified third portions 91″ and 91‴ can move the working segment portion 116 of the swingable lever 112 leftward in a direction perpendicular to the longitudinal direction of the chassis 1 to prevent the working segment portion 116 of the swingable lever 112 from interfering with the levers 2 and 3. Consequently, in the cassette tape player of the present invention, it is possible to move the levers 2 and 3 smoothly forward without causing troubles.

We claim:

1. A cassette tape player comprising: a quick traverse lever so mounted on a chassis of said player as to be movable forward and rearward in a reciprocating manner in a longitudinal direction of said chassis, which quick traverse lever moves forward to move a head plate rightward so as to perform a quick traverse operation of a tape of said player, said head plate being so mounted on said chassis as to be slidable rightward and leftward along said chassis; and a rewinding lever so mounted on said chassis as to be movable forward and rearward in a reciprocating manner in the longitudinal direction of said chassis, which rewinding lever moves forward to move said head plate rightward so as to realize a change in traveling direction of said tape so that a rewinding opeation of said tape is conducted; wherein, the improvement comprises:

said player further including: an actuating mechanism for realizing a change in traveling direction of said tape, the actuating mechanism being swingably mounted on said chassis while movable forward and rearward in the longitudinal direction of said chassis; and a spring for urging said actuating mechanism rearward and for biasing the same counterclockwise in its normal condition, said spring mounted on said chassis; and · each of said quick traverse lever and said rewinding lever including: a first portion which abuts on a working segment both in its inoperative condition and at a time when each of said levers is moved forward, to prevent said working segment from rotating in a urging direction in which said working segment is urged, said working segment being provided in said actuating mechanism; a second portion which permits said working segment to rotate in said urging direction and engage with said second portion so as to restrict the forward movement of each of said levers in stroke, said working segment having been separated from said first portion through the forward movement of each of said levers; and a third portion which permits one of said levers to move forward further in stroke than said second portion restricts without causing said working segment to engage with said second portion, in a condition in which the other of said levers is in its inoperative condition to have said first portion abut on said working segment of said actuating mechanism.

2. The cassette tape player as set forth in claim 1, wherein:

said actuating mechanism is constructed of: a slidable segment which is movable forward and rearward in the longitudinal direction of said chassis while connected with a channel selector mechanism; and an elongated swingable lever which is movable forward and rearward in the longitudinal direction of said chassis while swingable in a horizontal plane of said chassis and force to rotate counterclockwise in its normal condition, an upper portion of said elongated swingable lever being so connected with said slidable segment as to permit said slidable segment to freely rotate relative to said elongated swingable lever and to move forward and rearward in the longitudinal direction of said chassis together with said elongated swingable lever.

3. The cassette tape player as set forth in claim 1 or 2, wherein:

each of said levers is provided with a working window defined by a peripheral edge, one side of which peripheral edge sequentially forms said first portion said second portion and said third portion of each of said levers .

4. The cassette tape player as set forth in claim 3, wherein:

said third portion each of said levers is constructed of an inclined portion which forcibly moves said working segment having abutted thereon in a direction counter to said urging direction of said working segment when each of said levers is moved forward in the longitudinal direction of said chassis, so that said working segment is moved further leftward than an upper end of said third portion of each of said levers.

* * * * *